United States Patent
Ma et al.

(10) Patent No.: US 12,117,537 B2
(45) Date of Patent: Oct. 15, 2024

(54) SECONDARY POSITIONING REFERENCE SIGNALS FOR NON-TERRESTRIAL NETWORKS IN 5G NEW RADIO

(71) Applicant: QUALCOMM Incorporated, San Diego, CA (US)

(72) Inventors: Jun Ma, San Diego, CA (US); Xiao Feng Wang, San Diego, CA (US); Qiang Wu, San Diego, CA (US); Huilin Xu, Temecula, CA (US); Dan Zhang, San Diego, CA (US); Iyab Issam Sakhnini, San Diego, CA (US); Yiqing Cao, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 320 days.

(21) Appl. No.: 17/793,524

(22) PCT Filed: Feb. 7, 2020

(86) PCT No.: PCT/CN2020/074513
§ 371 (c)(1),
(2) Date: Jul. 18, 2022

(87) PCT Pub. No.: WO2021/155578
PCT Pub. Date: Aug. 12, 2021

(65) Prior Publication Data
US 2023/0051054 A1  Feb. 16, 2023

(51) Int. Cl.
*G01S 19/25* (2010.01)
*G01S 5/10* (2006.01)
(Continued)

(52) U.S. Cl.
CPC .............. *G01S 19/256* (2013.01); *G01S 5/10* (2013.01); *H04W 64/00* (2013.01); *H04W 84/06* (2013.01)

(58) Field of Classification Search
CPC ........ G01S 19/256; G01S 5/10; H04W 64/00; H04W 84/06
See application file for complete search history.

(56) References Cited

U.S. PATENT DOCUMENTS

2009/0149202 A1* 6/2009 Hill ....................... G01S 5/0289
342/357.22
2010/0331013 A1* 12/2010 Zhang ................... G01S 5/0249
455/456.2
(Continued)

FOREIGN PATENT DOCUMENTS

CN          104159241 A      11/2014
CN          110557191 A      12/2019
(Continued)

OTHER PUBLICATIONS

ERICSSON: "Remaining Issues of OTDOA for NB-IoT", 3GPP TSG-RAN1 Meeting #88, R1-1701885, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 13, 2016-Feb. 17, 2016, Feb. 6, 2017, pp. 1-2, XP051220220, Section 2.
(Continued)

*Primary Examiner* — Adam D Houston
(74) *Attorney, Agent, or Firm* — Procopio, Cory, Hargreaves & Savitch LLP/Qualcomm

(57) ABSTRACT

Satellites in a non-terrestrial network may provide positioning reference signals (PRS) to user equipment (UE), with which the UE may determine its position using propagation delay difference measurements, such as Time Difference of Arrival (TDOA) measurement. Due to the large distances between satellites and the UE, the propagation delay differences in the PRS received from satellites may exceed half a radio frame, resulting in a frame level timing ambiguity in the differential measurements. The satellites transmit sec-
(Continued)

ondary PRS, along with primary PRS, that include timing information to resolve frame level timing ambiguity of the primary PRS. The positioning occasions in the secondary PRS, for example, may be aligned with corresponding positioning occasions primary PRS within each radio frame, and are transmitted with a periodicity that is an integer multiple (greater than 1) of that of the primary PRS to resolve the frame level timing ambiguity of the primary PRS.

30 Claims, 13 Drawing Sheets

(51) Int. Cl.
  *H04W 64/00* (2009.01)
  *H04W 84/06* (2009.01)

(56) References Cited

U.S. PATENT DOCUMENTS

| | | | | |
|---|---|---|---|---|
| 2015/0188678 | A1* | 7/2015 | Wu | G01S 1/14 455/456.6 |
| 2016/0134402 | A1* | 5/2016 | Park | H04L 27/2663 370/329 |
| 2017/0102447 | A1* | 4/2017 | Choi | H04W 56/001 |
| 2019/0037529 | A1 | 1/2019 | Edge et al. | |
| 2023/0179295 | A1* | 6/2023 | Duan | G01S 19/00 455/427 |
| 2024/0069143 | A1* | 2/2024 | Hirzallah | G01S 5/0246 |
| 2024/0089893 | A1* | 3/2024 | Masal | H04W 64/00 |
| 2024/0195489 | A1* | 6/2024 | Charbit | H04B 7/18519 |
| 2024/0251374 | A1* | 7/2024 | Wei | G01S 5/10 |

FOREIGN PATENT DOCUMENTS

| | | |
|---|---|---|
| WO | WO-2016164085 A1 | 10/2016 |
| WO | 2021142604 A1 | 7/2021 |

OTHER PUBLICATIONS

HUAWEI., et al., "On NPRS for OTDOA", 3GPP TSG RAN WG1 Meeting #92, R1-1801885, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 26, 2018-Mar. 2, 2018, Feb. 16, 2018, 6 Pages, XP051397043, Figures 4,5, 8, 9, Section 2.
Nokia, et al., "Positioning in NTN", 3GPP TSG RAN WG1 Meeting #99, R1-1913022, Reno, USA, Nov. 18-22, 2019, pp. 1-7.
Supplementary European Search Report—EP20918110—Search Authority—Berlin—Sep. 21, 2023.
International Search Report and Written Opinion—PCT/CN2020/074513—ISA/EPO—Nov. 12, 2020.
QUALCOMM Incorporated: "On Demand Transmission of PRS for NR," 3GPP Draft, 3GPP TSG-RAN WG2 Meeting #104, R2-1817902_ (On Demand PRS), 3rd Generation Partnership Project (3GPP), Mobile Competence Centre, 650, Route Des Lucioles, F-06921, Sophia-Antipolis Cedex, France, vol. Ran WG2. No, Spokane. USA, Nov. 12, 2018-Nov. 16, 2018, Nov. 12, 2018 (Nov. 12, 2018), XP051557415, 27 pages, Retrieved from the Internet: URL: http://www.3gpp.org/ftp/Meetings%5F3GPP%5FSYNC/RAN2/Docs/R2%2D1817902%2Ezip [retrieved on Nov. 12, 2018], the whole document, Sections 9.2.x.3 and 9.2.x.6; figures9.2.x.3-1,9.2.x.6-1, 9.2.x.2.1,9.2.x.3.1.

* cited by examiner

SECONDARY POSITIONING REFERENCE SIGNALS FOR NON-TERRESTRIAL NETWORKS IN 5G NEW RADIO

CROSS REFERENCE TO RELATED APPLICATIONS

This application is a National Stage Entry filed under 35 U.S.C. 371 of PCT/CN2020/074513, filed on Feb. 7, 2020, entitled "SECONDARY POSITIONING REFERENCE SIGNALS FOR NON-TERRESTRIAL NETWORKS IN 5G NEW RADIO," which is assigned to the assignee hereof and is expressly incorporated herein by reference in its entirety.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal-frequency-division-multiplexing (DFT-S-OFDM). A wireless multiple-access communications system may include a number of base stations or network access nodes, each simultaneously supporting communication for multiple communication devices, which may be otherwise known as user equipment (UE).

It is often desirable for a UE, such as a smartphone, laptop, Internet-of-Things (IOT) device, tracking device, or some other portable or moveable device, to be capable of determining its location. For example, the location of a UE may be sent to a location services (LCS) client which needs to know the location of the UE (e.g., in the case of an emergency services call or to provide some service to the user of the UE such as navigation assistance or direction finding). In addition, a UE may use knowledge of its location to provide services to a user of the UE (e.g., navigation), to applications operating on the mobile device and to an external client. For example, a UE may use location to determine whether a trigger event has occurred (such as the UE moving into or out of a geofence area) and, when detecting such an event, may send a report and possibly the location of the UE to an external client. The terms "location", "location estimate", "position", "position estimate" and "position fix" are synonymous and are used interchangeably herein.

In one type of position determination for a UE, the UE may measure time differences between the arrival of downlink (DL) signals, such as positioning reference signals (PRS) that are received from a plurality of transmitters, such as terrestrial base stations. The measured differences in the time of arrival of PRS from the transmitters and known positions of the transmitters may be used to calculate the location of the UE with a high degree of accuracy, e.g., using Observed Time Difference of Arrival (OTDOA) positioning.

Some wireless communications systems (e.g., non-terrestrial networks (NTNs)) may utilize satellites (which may broadly refer to any high-altitude platform (e.g., drones, balloons, etc.)) as relay devices between ground base stations and ground gateways. In NTNs, the satellites may be great distances from the UE. Consequently, differences in the time of arrival of PRS signals transmitted from satellites may be large, which may make these differential types of measurements unsuitable for positioning of a UE. Accordingly, improved solutions for differential measurements from NTNs may be desirable.

SUMMARY

Satellites in a non-terrestrial network may provide positioning reference signals (PRS) to user equipment (UE), with which the UE may determine its position using propagation delay difference measurements, such as Time Difference of Arrival (TDOA) measurement. Due to the large distances between satellites and the UE, the propagation delay differences in the PRS received from satellites may exceed half a radio frame, resulting in a frame level timing ambiguity in the differential measurements. The satellites transmit secondary PRS, along with primary PRS, that include timing information to resolve frame level timing ambiguity of the primary PRS. The positioning occasions in the secondary PRS, for example, may be aligned with corresponding positioning occasions primary PRS within each radio frame, and are transmitted with a periodicity that is an integer multiple (greater than 1) of that of the primary PRS to resolve the frame level timing ambiguity of the primary PRS.

In one implementation, a method for supporting positioning of a user equipment (UE) performed by the UE, includes receiving primary positioning reference signals (PRS) from a plurality of satellites in a non-terrestrial network, wherein the primary PRS is transmitted periodically with one or more primary PRS positioning occasions per radio frame; receiving secondary PRS from the plurality of satellites in the non-terrestrial network, wherein the secondary PRS is transmitted periodically with one or more secondary PRS positioning occasions per radio frame and provides timing information to resolve frame level timing ambiguity of the primary PRS; and determining a Time Difference of Arrival (TDOA) measurement using the primary PRS received from a first satellite and a second satellite in the non-terrestrial network and the secondary PRS received from the first satellite and the second satellite, wherein the secondary PRS received from the first satellite and the second satellite resolve frame level timing ambiguity in the TDOA measurement caused by propagation delay difference between the first satellite and the UE and the second satellite and the UE exceeding half the radio frame.

In one implementation, a user equipment (UE) configured to support positioning in a non-terrestrial network includes a wireless transceiver configured to wirelessly communicate with satellites in the non-terrestrial network; at least one memory; and at least one processor coupled to the wireless transceiver and the at least one memory, the at least one processor configured to: receive primary positioning reference signals (PRS) from a plurality of satellites in the non-terrestrial network, via the wireless interface, wherein the primary PRS is transmitted periodically with one or more primary PRS positioning occasions per radio frame; receive secondary PRS from the plurality of satellites in the non-terrestrial network, via the wireless interface, wherein the secondary PRS is transmitted periodically with one or more secondary PRS positioning occasions per radio frame and provides timing information to resolve frame level timing ambiguity of the primary PRS; and determine a Time Difference of Arrival (TDOA) measurement using the primary PRS received from a first satellite and a second satellite in the non-terrestrial network and the secondary PRS received from the first satellite and the second satellite, wherein the secondary PRS received from the first satellite and the second satellite resolve frame level timing ambiguity in the TDOA measurement caused by propagation delay difference between the first satellite and the UE and the second satellite and the UE exceeding half the radio frame.

In one implementation, a method for supporting positioning of a user equipment (UE) performed by a satellite in a non-terrestrial network, includes transmitting primary positioning reference signals (PRS), wherein the primary PRS is transmitted periodically with one or more primary PRS positioning occasions per radio frame; and transmitting secondary PRS, wherein the secondary PRS is transmitted periodically with one or more secondary PRS positioning occasions per radio frame and provides timing information to resolve frame level timing ambiguity of the primary PRS; wherein the secondary PRS resolves frame level timing ambiguity in Time Difference of Arrival (TDOA) measurements determined by the UE using the primary PRS and the secondary PRS from the satellite with primary PRS and secondary PRS from a second satellite that is caused by propagation delay difference between the satellite and the UE and between the second satellite and the UE exceeding half of the radio frame.

In one implementation, a satellite in a non-terrestrial network configured to support positioning of a user equipment (UE), includes a wireless transceiver configured to wirelessly communicate with the UE; at least one memory; and at least one processor coupled to the wireless transceiver and the at least one memory, the at least one processor configured to: transmit primary positioning reference signals (PRS), wherein the primary PRS is transmitted periodically with one or more primary PRS positioning occasions per radio frame; and transmit secondary PRS, wherein the secondary PRS is transmitted periodically with one or more secondary PRS positioning occasions per radio frame and provides timing information to resolve frame level timing ambiguity of the primary PRS; wherein the secondary PRS resolves frame level timing ambiguity in Time Difference of Arrival (TDOA) measurements determined by the UE using the primary PRS and the secondary PRS from the satellite with primary PRS and secondary PRS from a second satellite that is caused by propagation delay difference between the satellite and the UE and between the second satellite and the UE exceeding half of the radio frame.

Figure 1:
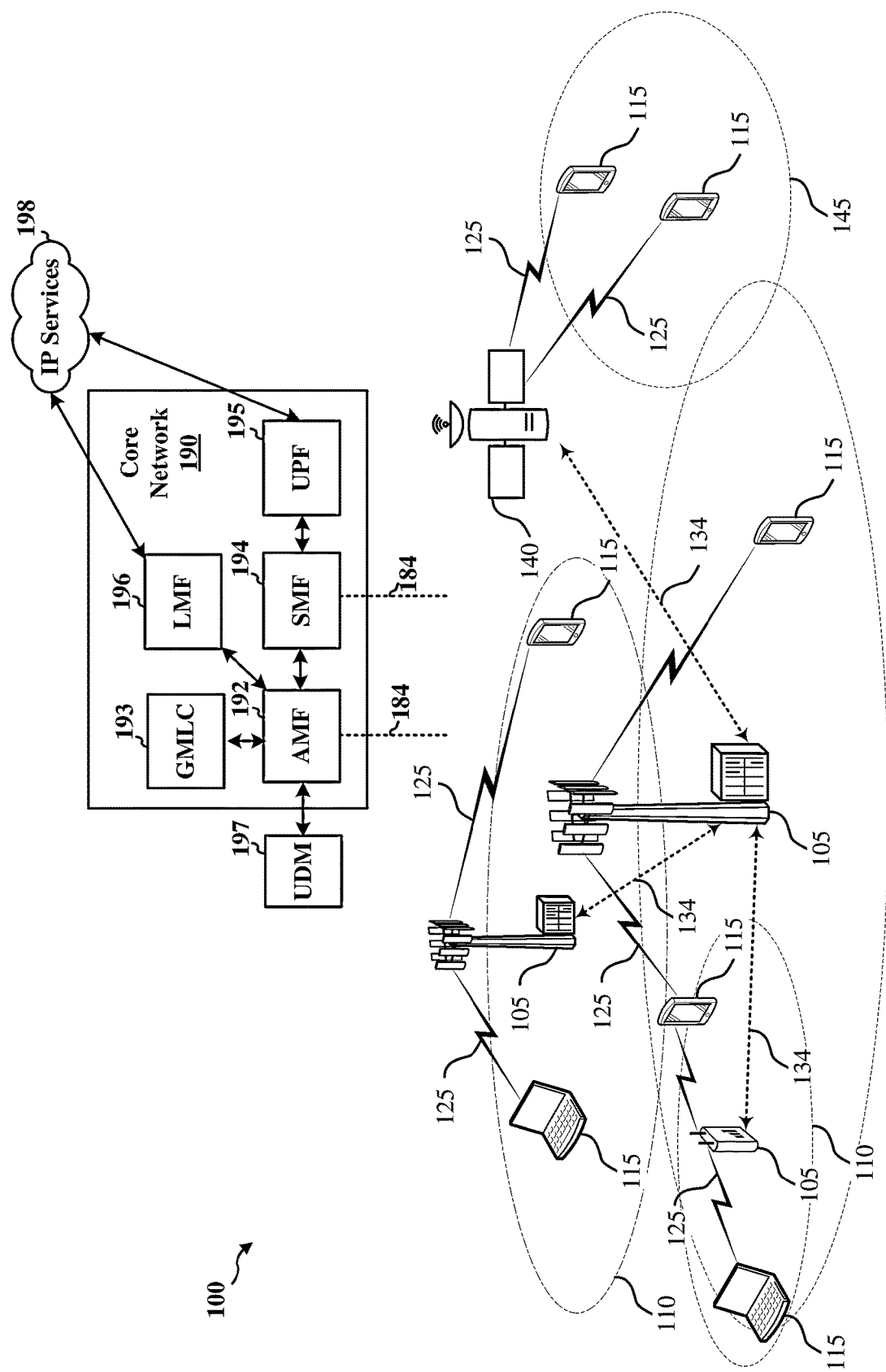
FIG. 1 shows a diagram of a non-terrestrial network capable of supporting positioning of a user equipment (UE) based on propagation delay difference measurements of positioning reference signals (PRS) transmitted by satellites.

Like reference symbols in the various drawings indicate like elements, in accordance with certain example implementations. In addition, multiple instances of an element may be indicated by following a first number for the element with a letter or a hyphen and a second number. For example, multiple instances of an element 140 may be indicated as 140-1, 140-2, 140-3 etc. When referring to such an element using only the first number, any instance of the element is to be understood (e.g. element 140 in the previous example would refer to elements 140-1, 140-2 and 140-3).

DETAILED DESCRIPTION

The following description is directed to some implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

It is often desirable to know the location of a user equipment (UE), such as a cellular phone, or other wireless communication device. For example, a location services (LCS) client may desire to know the location of a UE in the case of an emergency services call or to provide some service to the user of the UE such as personal navigation, asset tracking, locating a friend or family member, etc. In addition, a UE may use knowledge of its location to provide services to a user of the UE (e.g. navigation), to applications operating on the UE and to an external client. For example, a UE may use the location of the UE to determine whether a trigger event has occurred (such as the UE moving into or out of a geofence area) and, when detecting such an event, may send a report and possibly the location of the UE to an external client. The terms "location", "location estimate", "position", "position estimate" and "position fix" are synonymous and are used interchangeably herein.

A common means to determine the location of a device is to use a satellite position system (SPS), such as the well-known Global Positioning Satellite (GPS) system or Global Navigation Satellite System (GNSS), which employ a number of satellites that are in orbit around the Earth. Position measurements using GNSS are based on measurements of propagation delay times of GNSS signals broadcast from a number of orbiting satellites to an GNSS receiver. Once the GNSS receiver has measured the signal propagation delays for each satellite, the range to each satellite can be determined and precise navigation information including 3-dimensional position, velocity and time of day of the GNSS receiver can then be determined using the measured ranges and the known locations of the satellites.

Satellites may also be used in in wireless communications systems (e.g., non-terrestrial networks (NTNs)), for example, as relay devices between ground base stations and ground gateways and one or more UEs. There is ongoing work in the Third Generation Partnership Project (3GPP) to add support for a new Radio Access Technology (RAT) for 5G networks based on satellite access. A UE, for example, may access a satellite (instead of a terrestrial base station) and connect to a satellite earth station, which in turn would connect to a 5G Core Network (5GCN). The 5GCN would treat the satellite system as another type of Radio Access Network (RAN) distinct from, but also similar to, a 5G NR RAN (NG-RAN) or WLAN (WiFi) based RAN.

Various implementations relate generally to satellites in a non-terrestrial network may provide positioning reference signals (PRS) to UE, with which the UE may determine its position using propagation delay difference measurements, such as Time Difference of Arrival (TDOA) measurement. The PRS provided by the satellites include a primary PRS, with which the propagation delay difference measurements are made. The primary PRS, and thus, the propagation delay difference measurements, however, suffer from frame level timing ambiguity due to the large distances between satellites and the UE. For example, the propagation delay difference measurement for the primary PRS may exceed half a radio frame. The satellites transmit secondary PRS, along with primary PRS. The secondary PRS includes timing information with which the UE may resolve frame level timing ambiguity of the primary PRS. The positioning occasions in the secondary PRS, for example, may be aligned with corresponding positioning occasions primary PRS within each radio frame, and are transmitted with a periodicity that is an integer multiple (greater than 1) of that of the primary PRS to resolve the frame level timing ambiguity of the primary PRS.

Several aspects of systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a diagram of an example wireless communications system 100 and an access network. The wireless communications system 100 includes base stations 105, UEs 115, one or more satellites 140, and a core network 190. In some examples, the wireless communications system 100 may be a Long Term Evolution (LTE) network, an LTE-Advanced (LTE-A) network, an LTE-A Pro network, or a New Radio (NR) network, or any other air interface that includes the use of PRS used in a non-terrestrial network scenario. In some implementations, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

The base stations 105 may be configured for 5G NR (collectively referred to as Next Generation RAN (NG-RAN)) and may interface with core network 190 through backhaul links 184. In some implementations, the base stations may be configured for 4G LTE (collectively referred to as Evolved Universal Mobile Telecommunications System (UMTS) Terrestrial Radio Access Network (E-UTRAN)) and may interface with a core network, such as an Evolved Packet Core through backhaul links (e.g., 51 interface). The backhaul links 184 may be wired or wireless.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

Wireless communications system 100 may be a non-terrestrial network (NTN) and may utilize one or more satellites 140 (which may broadly refer to any high-altitude platform) (e.g., as relay devices). For example, base stations 105 (or ground gateways) may wirelessly communicate with UEs 115 via one or more satellites 140 (e.g., or high-altitude platforms). The satellites 140 may relay communications between base stations 105 and UEs 115, or in some implementations comprise or otherwise perform functions ascribed herein to base stations 105. Each satellite 140 may be associated with a geographical area 145 in which communications with various UEs 115 is supported. In some implementations, a geographical area 145 may have properties ascribed herein to geographic coverage areas 110. Each satellite 140 may provide communication coverage for a respective geographical area 145 via communication links 125, and communication links 125 between a satellite 120 and a UE 115 may utilize one or more carriers.

Communication links 125 shown in wireless communications system 100 may include upstream transmissions from a UE 115 (e.g., to a satellite 140, to a base station 105 via satellite 140), or downstream transmissions to a UE 115 (e.g., from a satellite 140, from a base station 105 via satellite 140). In some implementations, transmissions from the ground (e.g., from a UE 115 or base station 105) to a satellite 140 may be referred to as uplink transmissions and transmissions from a satellite 140 to the ground (e.g., to a UE 115 or base station 105) may be referred to as downlink transmissions. Thus, depending on whether a gateway (e.g., a base station 105) may be collocated with (e.g., included in) a satellite 140 or at the ground, either upstream or downstream transmissions may include a mix of uplink and downlink transmissions.

Downstream transmissions may also be called forward link transmissions while upstream transmissions may also be called reverse link transmissions. A geographical area 145 may be an area associated with a transmission beam of a satellite 140. In some implementations, a geographical area 145 may be referred to as a beam footprint.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some implementations, UEs 115 may be designed to support critical functions (e.g., mission critical functions), and a wireless communications system 100 may be configured to provide ultra-reliable communications for these functions.

In some implementations, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or may be otherwise unable to receive transmissions from a base station 105. In some implementations, groups of UEs 115 communicating via D2D communications may utilize a one-to-many (1:M) system in which each UE 115 transmits to every other UE 115 in the group. In some implementations, a base station 105 facilitates the scheduling of resources for D2D communications. In other cases, D2D communications are carried out between UEs 115 without the involvement of a base station 105.

Base stations 105 may communicate with the core network 190 and with one another. For example, base stations 105 may interface with the core network 190 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 190). Base stations 105 may communicate with satellites 140 wirelessly over backhaul links 134 (e.g., via an X2 or other interface).

The core network 190 may provide user authentication, access authorization, tracking, Internet Protocol (IP) connectivity, and other access, routing, or mobility functions. The core network 190 is illustrated as a 5G Core Network and may include, e.g., an Access and Mobility Management Function (AMF) 192, a Gateway Mobile Location Center (GMLC) 193, a Session Management Function (SMF) 194, and a User Plane Function (UPF) 195, and a Location Management Function (LMF) 196. The AMF 192 may be in communication with a Unified Data Management (UDM) 197. The AMF 192 is the control node that processes the signaling between the UEs 104 and the core network 190 and which, for positioning functionality, may communicate with the LMF 196. The GMLC 193 may be used to allow an external client, within IP Services 198, to receive location information regarding the UEs. All user Internet protocol (IP) packets may be transferred through the UPF 195. The UPF 195 provides UE IP address allocation as well as other functions. The UPF 195 is connected to the IP Services 198. The IP Services 198 may include the Internet, an intranet, an IP Multimedia Subsystem (IMS), a PS Streaming Service, and/or other IP services. If desired, the core network 190 may be another type of network core, such as an EPC, and may include other types of network entities. For example, the AMF 192 may be replaced with a Mobility Management Entity (MME) and the LMF 196 may be replaced by an Enhanced Serving Mobile Location Center (E-SMLC).

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some implementations, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some implementations perform packet segmentation and reassembly to communicate over logical channels. A Media Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 190 supporting radio bearers for user plane data. At the Physical (PHY) layer, transport channels may be mapped to physical channels.

A UE 104 may enter a connected state with the wireless communication system 100 that may include a base station 105 or satellite 140 for position determination. In particular implementations, the UE 115 may have circuitry and processing resources capable of obtaining location related measurements. Location related measurements obtained by UE 115 may include measurements of signals received from satellite vehicles belonging to a Satellite Positioning System (SPS) or Global Navigation Satellite System (GNSS) such as GPS, GLONASS, Galileo or Beidou and/or may include measurements of signals received from terrestrial base stations fixed at known locations (e.g., such as base stations 105 in FIG. 1). The UE 115 or location server (e.g., LMF 196 or E-SMLC, H-SLP), to which UE 115 may send the measurements, may then obtain a location estimate for the UE 115 based on these location related measurements using any one of several position methods such as, for example, GNSS, Assisted GNSS (A-GNSS), Advanced Forward Link Trilateration (AFLT), Observed Time Difference Of Arrival (OTDOA), WLAN (also referred to as WiFi) positioning, Angle of Departure (AOD), Angle of Arrival (AOA), multi-cell Round Trip signal propagation Time (multi-RTT), or Enhanced Cell ID (ECID) or combinations thereof. In some of these techniques (e.g. A-GNSS, AFLT and OTDOA), pseudoranges or timing differences may be measured at UE 115 relative to three or more terrestrial base stations 105 fixed at known locations or satellites 140 based at least in part, on pilots, positioning reference signals (PRS) or other positioning related signals transmitted by the base stations 105 or satellites and received at the UE 115.

In some examples, the base stations 105 or satellites 140 may transmit downlink positioning, such as PRS. The positioning signal transmissions may be configured for a specific UE 115 to measure one or more parameters and use as part of UE based positioning technique or to report as part of a UE-assisted positioning technique. The PRS transmission and report parameter feedback may support various location services (for example, navigation systems, and emergency communications). In some examples, the report parameters supplement one or more additional location systems supported by the UE 115 (such as global positioning system (GPS) technology).

A base station 105 or satellite 140 may configure a PRS transmission on one or more PRS resources of a channel. A PRS resource may span resource elements of multiple physical resource blocks (PRBs) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel.

Aspects of wireless communications system 100 may include use of PRS transmissions by the base station 105 or satellite 140 for UE location determination. For UE based positioning, satellite positioning information, such as the positions, velocities, and directions of satellites 140, may be provided to the UE 115, e.g., by a serving satellite 140, and the UE 115 may use the satellite positioning information, along with PRS measurements to determine an estimated position of the UE 115. In UE-assisted positioning, the UE 115 may provide a measurement report with position measurements to a location server and the location server may determine a position estimate for the UE 115, e.g., using the position measurements.

Figure 2:
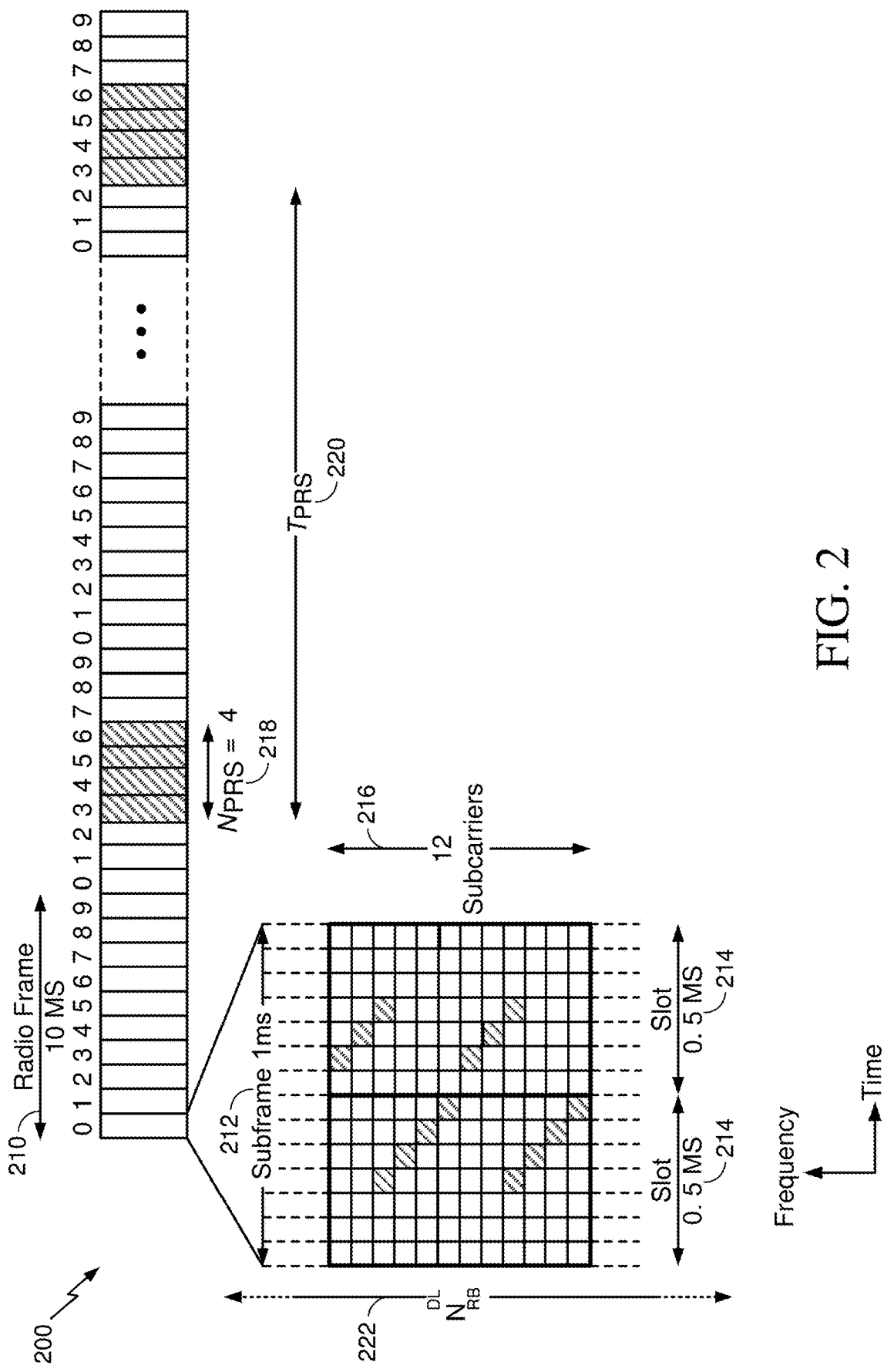
FIG. 2 shows a structure of an example subframe sequence with PRS positioning occasions.

FIG. 2 shows a structure of an example subframe sequence 200 with PRS positioning occasions. Subframe sequence 200 may be applicable to broadcast of PRS signals from base stations 105 in communication systems 100. While FIG. 2 provides an example of a subframe sequence for LTE, similar subframe sequence implementations may be realized for other communication technologies/protocols, such as 5G or NR and in non-terrestrial networks, such as wireless communication system 100 shown in FIG. 1. In FIG. 2, time is represented horizontally (e.g., on an X axis) with time increasing from left to right, while frequency is represented vertically (e.g., on a Y axis) with frequency increasing (or decreasing) from bottom to top. As shown in FIG. 2, downlink and uplink Radio Frames 210 may be of 10 ms duration each. For downlink Frequency Division Duplex (FDD) mode, Radio Frames 210 are organized, in the illustrated embodiments, into ten subframes 212 of 1 ms duration each. Each subframe 212 comprises two slots 214, each of, for example, 0.5 ms duration.

In the frequency domain, the available bandwidth may be divided into uniformly spaced orthogonal subcarriers 216. For example, for a normal length cyclic prefix using, for example, 15 kHz spacing, subcarriers 216 may be grouped into a group of twelve (12) subcarriers. Each grouping, which comprises the 12 subcarriers 216, is termed a resource block and, in the example above, the number of subcarriers in the resource block may be written as $N_{SC}^{RB}=12$. For a given channel bandwidth, the number of available resource blocks on each channel 222, which is also called the transmission bandwidth configuration 222, is indicated as $N_{RB}^{DL}$. For example, for a 3 MHz channel bandwidth in the above example, the number of available resource blocks on each channel 222 is given by $N_{RB}^{DL}=15$.

In the wireless communication system 100 illustrated in FIG. 1, a base station 105 or satellite 140, may transmit frames, or other physical layer signaling sequences, supporting PRS signals (i.e. a downlink (DL) PRS) according to frame configurations either similar to, or the same as that, shown in FIG. 2 and (as described later) in FIG. 3, which may be measured and used for UE (e.g., UE 115) position determination. As noted, other types of wireless nodes and base stations (e.g., a gNB or WiFi AP) may also be configured to transmit PRS signals configured in a manner similar to (or the same as) that depicted in FIGS. 2 and 3. Since transmission of a PRS by a wireless node or base station is directed to all UEs within radio range, a wireless node or base station can also be considered to transmit (or broadcast) a PRS.

A PRS, which has been defined in Third Generation Partnership Project (3GPP) LTE Release-9 and later releases, may be transmitted by wireless nodes (e.g., base stations 105) after appropriate configuration (e.g., by an Operations and Maintenance (O&M) server). A PRS may be transmitted in special positioning subframes that are grouped into positioning occasions. PRS occasions may be grouped into one or more PRS occasion groups. For example, in LTE, a PRS positioning occasion can comprise a number $N_{PRS}$ of consecutive positioning subframes where the number $N_{PRS}$ may be between 1 and 160 (e.g., may include the values 1, 2, 4 and 6 as well as other values). The PRS positioning occasions for a cell supported by a wireless node may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). As an example, FIG. 2 illustrates a periodicity of positioning occasions where $N_{PRS}$ equals 4 218 and $T_{PRS}$ is greater than or equal to 20 220. In some aspects, $T_{PRS}$ may be measured in terms of the number of subframes between the start of consecutive positioning occasions.

As discussed herein, in some aspects, OTDOA assistance data, sometimes referred to herein as PRS configurations, may be provided to a UE 115, e.g., by a location server in a terrestrial network or a serving satellite in a non-terrestrial network, for a "reference cell" and one or more "neighbor cells" or "neighboring cells" relative to the "reference cell." For example, the OTDOA assistance data may provide the center channel frequency of each cell, various PRS configuration parameters (e.g., $N_{PRS}$, $T_{PRS}$, muting sequence, frequency hopping sequence, PRS ID, PRS bandwidth), a cell global ID, PRS signal characteristics associated with a directional PRS, and/or other cell related parameters applicable to OTDOA or some other position method.

PRS-based positioning by a UE 115 may be facilitated by indicating the serving cell for the UE 115 in the OTDOA assistance data (e.g., with the reference cell indicated as being the serving cell).

In some aspects, OTDOA assistance data may also include "expected RSTD" parameters, which provide the UE 115 with information about the RSTD values the UE 115 is expected to measure at its current location between the reference cell and each neighbor cell, together with an uncertainty of the expected RSTD parameter. The expected RSTD, together with the associated uncertainty, may define a search window for the UE 115 within which the UE 115 is expected to measure the RSTD value. OTDOA assistance information may also include PRS configuration information parameters, which allow a UE 115 to determine when a PRS positioning occasion occurs on signals received from various neighbor cells relative to PRS positioning occasions for the reference cell, and to determine the PRS sequence transmitted from various cells in order to measure a signal Time of Arrival (ToA) or RSTD.

Using the RSTD measurements, the known absolute or relative transmission timing of each cell, and the known position(s) of wireless node physical transmitting antennas for the reference and neighboring cells, the UE 115's position may be calculated (e.g., by the UE 115 or by the location server). More particularly, the RSTD for a neighbor cell "k" relative to a reference cell "Ref," may be given as (ToA$_k$-ToA$_{Ref}$), where the ToA values may be measured modulo one subframe duration (1 ms) to remove the effects of measuring different subframes at different times. ToA measurements for different cells may then be converted to RSTD measurements (e.g., as defined in 3GPP Technical Specification (TS) 36.214 entitled "Physical layer; Measurements") and sent to the location server by the UE 115. Using (i) the RSTD measurements, (ii) the known absolute or relative transmission timing of each cell, (iii) the known position(s) of physical transmitting antennas for the reference and neighboring cells, and/or (iv) directional PRS characteristics such as a direction of transmission, the UE 115's position may be determined.

Figure 3:
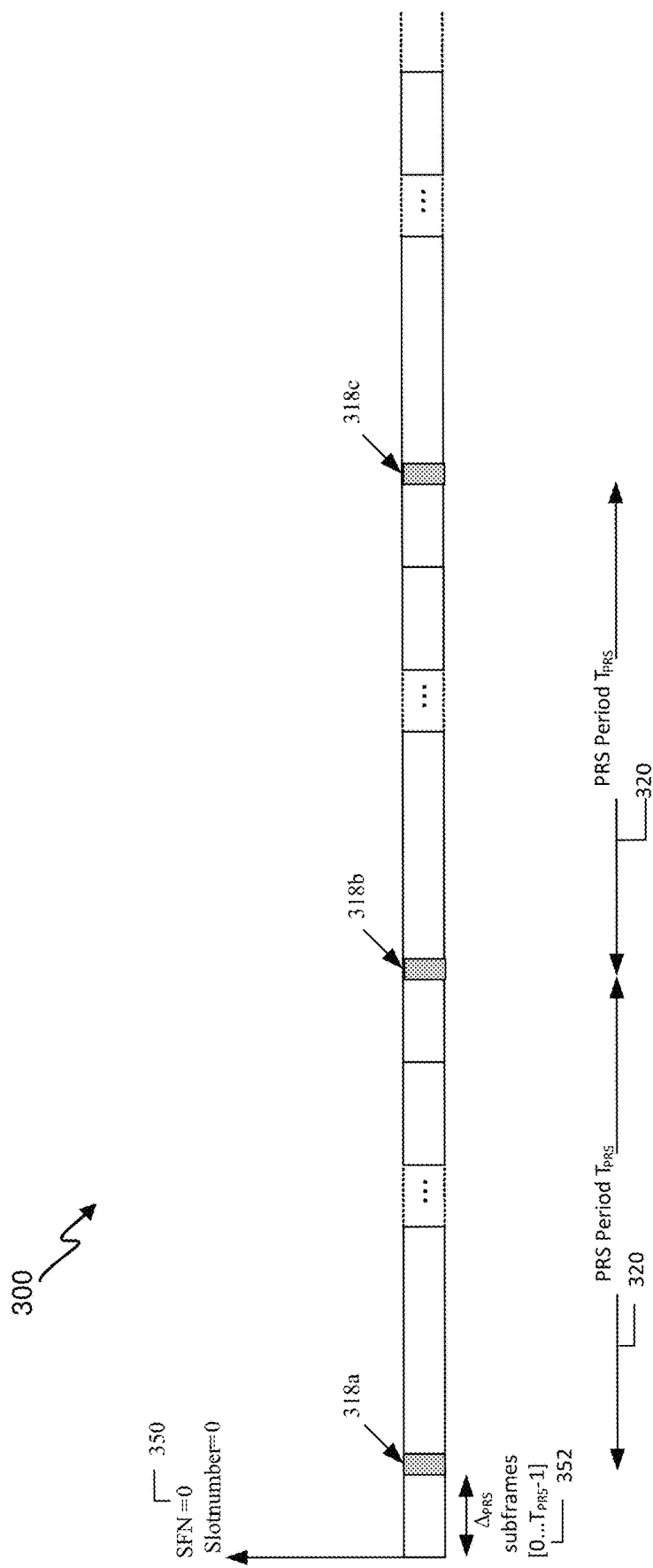
FIG. 3 illustrates an exemplary PRS configuration.

FIG. 3 illustrates an exemplary PRS configuration 300 for a cell supported by a wireless node (such as a base station 105 or satellite 140). Again, PRS transmission for LTE is assumed in FIG. 3, although the same or similar aspects of PRS transmission to those shown in and described for FIG. 3 may apply to 5G, NR, and/or other wireless technologies. FIG. 3 shows how PRS positioning occasions are determined by a System Frame Number (SFN), a cell specific subframe offset ($\Delta_{PRS}$) 352, and the PRS Periodicity (T$_{PRS}$) 320. Typically, the cell specific PRS subframe configuration is defined by a "PRS Configuration Index" I$_{PRS}$ included in the OTDOA assistance data. The PRS Periodicity (T$_{PRS}$) 320 and the cell specific subframe offset ($\Delta_{PRS}$) are defined based on the PRS Configuration Index I$_{PRS}$, in 3GPP TS 36.211 entitled "Physical channels and modulation," as illustrated in Table 1 below.

TABLE 1

| PRS configuration Index I$_{PRS}$ | PRS periodicity T$_{PRS}$ (subframes) | PRS subframe offset $\Delta_{PRS}$ (subframes) |
|---|---|---|
| 0-159 | 160 | I$_{PRS}$ |
| 160-479 | 320 | I$_{PRS}$ − 160 |
| 480-1119 | 640 | I$_{PRS}$ − 480 |
| 1120-2399 | 1280 | I$_{PRS}$ − 1120 |
| 2400-2404 | 5 | I$_{PRS}$ − 2400 |
| 2405-2414 | 10 | I$_{PRS}$ − 2405 |
| 2415-2434 | 20 | I$_{PRS}$ − 2415 |
| 2435-2474 | 40 | I$_{PRS}$ − 2435 |
| 2475-2554 | 80 | I$_{PRS}$ − 2475 |
| 2555-4095 | Reserved | |

A PRS configuration is defined with reference to the System Frame Number (SFN) of a cell that transmits PRS. PRS instances, for the first subframe of the N$_{PRS}$ downlink subframes comprising a first PRS positioning occasion, may satisfy:

$$(10 \times n_f + \lfloor n_s/2 \rfloor - \Delta_{PRS}) \bmod T_{PRS} = 0,$$

where n$_f$ is the SFN with 0≤n$_f$≤1023, n$_s$ is the slot number within the radio frame defined by n$_f$ with 0≤n$_s$≤19, T$_{PRS}$ is the PRS periodicity 320, and APRs is the cell-specific subframe offset 352.

As shown in FIG. 3, the cell specific subframe offset APRs 352 may be defined in terms of the number of subframes transmitted starting from System Frame Number 0 (Slot 'Number 0', marked as slot 350) to the start of the first (subsequent) PRS positioning occasion. In the example in FIG. 3, the number of consecutive positioning subframes (N$_{PRS}$) in each of the consecutive PRS positioning occasions 318a, 318b, and 318c equals 4.

In some aspects, when a UE 115 receives a PRS configuration index I$_{PRS}$ in the OTDOA assistance data for a particular cell, the UE 115 may determine the PRS periodicity T$_{PRS}$ 320 and PRS subframe offset APRs using Table 1. The UE 115 may then determine the radio frame, subframe and slot when a PRS is scheduled in the cell (e.g., using equation (1)). The OTDOA assistance data may be determined by, for example, the location server or a serving satellite, and includes assistance data for a reference cell, and a number of neighbor cells supported by various wireless nodes.

Typically, PRS occasions from all cells in a network that use the same frequency are aligned in time and may have a fixed known time offset (e.g., cell-specific subframe offset 352) relative to other cells in the network that use a different frequency. In SFN-synchronous networks all wireless nodes (e.g., base stations 105) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

A UE 115 may determine the timing of the PRS occasions of the reference and neighbor cells for OTDOA positioning, if the UE 115 can obtain the cell timing (e.g., SFN or Frame Number) of at least one of the cells, e.g., the reference cell or a serving cell. The timing of the other cells may then be derived by the UE 115 based, for example, on the assumption that PRS occasions from different cells overlap.

As defined by 3GPP (e.g., in 3GPP TS 36.211), for LTE systems, the sequence of subframes used to transmit PRS (e.g., for OTDOA positioning) may be characterized and defined by a number of parameters, as described previously, comprising: (i) a reserved block of bandwidth (BW), (ii) the configuration index I$_{PRS}$, (iii) the duration N$_{PRS}$, (iv) an optional muting pattern; and (v) a muting sequence periodicity T$_{REP}$ that can be implicitly included as part of the muting pattern in (iv) when present. In some cases, with a fairly low PRS duty cycle, N$_{PRS}$=1, T$_{PRS}$=160 subframes (equivalent to 160 ms), and BW=1.4, 3, 5, 10, 15, or 20 MHz. To increase the PRS duty cycle, the N$_{PRS}$ value can be increased to six (i.e., N$_{PRS}$=6) and the bandwidth (BW) value can be increased to the system bandwidth (i.e., BW=LTE system bandwidth in the case of LTE). An expanded PRS with a larger N$_{PRS}$ (e.g., greater than six) and/or a shorter T$_{PRS}$ (e.g., less than 160 ms), up to the full duty cycle (i.e., N$_{PRS}$=T$_{PRS}$), may also be used in later versions of LPP according to 3GPP TS 36.355. A directional PRS may be configured as just described according to 3GPP TSs and may, for example, use a low PRS duty cycle (e.g., $N_{PRS}=1$, $T_{PRS}=160$ subframes) or a high duty cycle.

Figure 4:
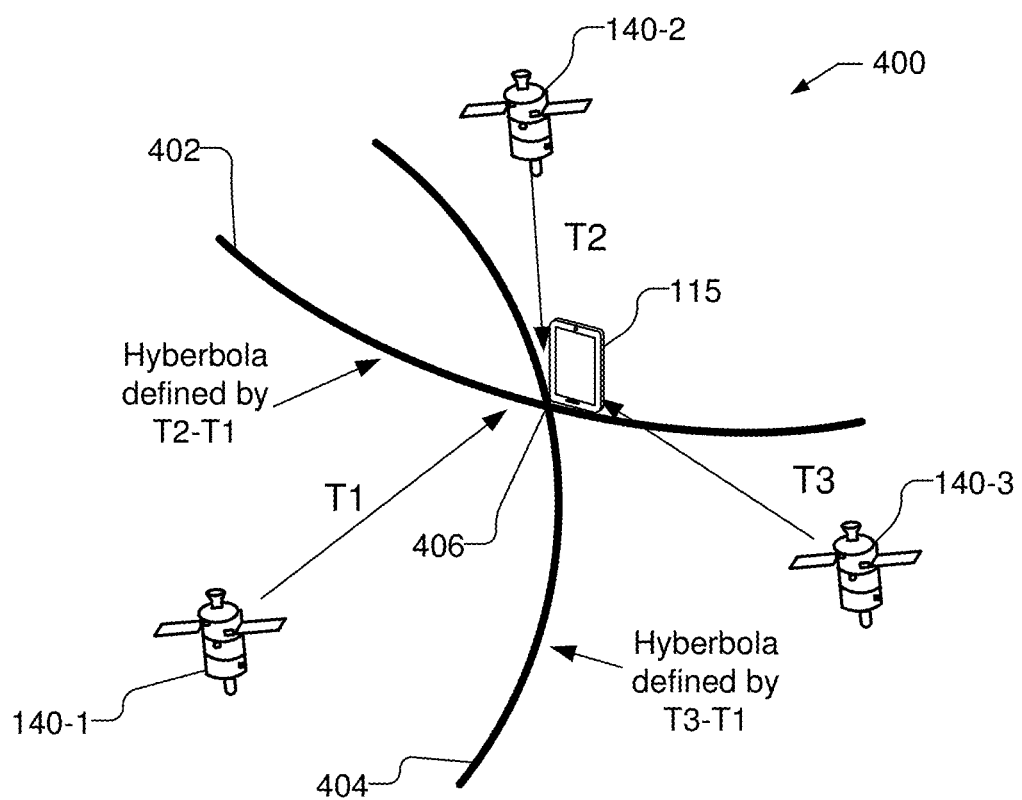
FIG. 4 illustrates position determination of a UE based on propagation delay difference measurements of PRS transmitted by satellites in an exemplary non-terrestrial network, according to various aspects of the disclosure.

FIG. 4 illustrates an exemplary wireless communications system 400 that is a non-terrestrial network, according to various aspects of the disclosure. In the example of FIG. 4, a UE 115 is attempting to calculate an estimate of its position, or assist another entity (e.g., a base station or core network component, another UE, a location server, a third party application, etc.) to calculate an estimate of its position. The UE 115 may communicate wirelessly with a plurality of satellites 140-1, 140-2, and 140-3 (collectively, satellites 140), which may correspond to any combination of satellites 140 in FIG. 1, using RF signals and standardized protocols for the modulation of the RF signals and the exchange of information packets. By extracting different types of information from the exchanged RF signals, and utilizing the layout of the wireless communications system 400 (i.e., the satellite locations, geometry, etc.), the UE 115 may determine its position, or assist in the determination of its position, in a predefined reference coordinate system. In an aspect, the UE 115 may specify its position using a two-dimensional coordinate system; however, the aspects disclosed herein are not so limited, and may also be applicable to determining positions using a three-dimensional coordinate system, if the extra dimension is desired. Additionally, while FIG. 4 illustrates one UE 115 and three satellites 140, as will be appreciated, there may be more UEs 115 and more or fewer satellites 140.

To support position estimates, the satellites 140 may be configured to broadcast reference RF signals (e.g., PRS) to UEs 115 in their coverage area to enable a UE 115 to measure characteristics of such reference RF signals. For example, the UE 115 may use the OTDOA positioning method, and the UE 115 may measure the RSTD between specific reference RF signals (e.g., PRS) transmitted by different pairs of network nodes.

Generally, RSTDs are measured between a reference network node (e.g., satellite 140-1 in the example of FIG. 4) and one or more neighbor network nodes (e.g., satellites 140-2 and 105-3 in the example of FIG. 4). The reference network node remains the same for all RSTDs measured by the UE 115 for any single positioning use of OTDOA and would typically correspond to the serving cell for the UE 115 or another nearby cell with good signal strength at the UE 115. In an aspect, where a measured network node is a cell supported by a satellite, the neighbor network nodes would normally be cells supported by satellites different from the satellite for the reference cell and may have good or poor signal strength at the UE 115. The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

To assist positioning operations, a serving satellite 140 may provide OTDOA assistance data to the UE 115 for the reference network node (e.g., satellite 140-1 in the example of FIG. 4) and the neighbor network nodes (e.g., satellites 140-2 and 105-3 in the example of FIG. 4) relative to the reference network node. For example, the OTDOA assistance data may provide the center channel frequency of each network node, various reference RF signal configuration parameters (e.g., the number of consecutive positioning subframes, periodicity of positioning subframes, muting sequence, frequency hopping sequence, reference RF signal ID, reference RF signal bandwidth), a network node global ID, and/or other cell related parameters applicable to OTDOA, as described above. The OTDOA assistance data may also indicate the serving cell for the UE 115 as the reference network node.

In an aspect, while the serving satellite may send the assistance data to the UE 115, the assistance data and satellite position information may be collected at a server and provided to the serving satellite from the server.

In the example of FIG. 4, the measured time differences between the reference cell of satellite 140-1 and the neighboring cells of satellites 140-2 and 140-3 are represented as T2-T1 and T3-T1, where T1, T2, and T3 represent the time of arrival (TOA) of a reference RF signal from the transmitting antenna(s) of satellite 140-1, 140-2, and 140-3, respectively, to the UE 115, and includes any measurement noise at the UE 115. The UE 115 may then convert the ToA measurements for different network nodes to RSTD measurements (e.g., as defined in 3GPP TS 36.214 entitled "Physical layer; Measurements") and (optionally) send them to the location server. Using (i) the RSTD measurements, (ii) the known absolute or relative transmission timing of each network node, (iii) the known position(s) of physical transmitting antennas for the reference and neighboring network nodes, and/or (iv) directional reference RF signal characteristics such as a direction of transmission, the UE's 115 position may be determined (either by the UE 115 or the location server).

The ToA $T_i$ at the UE 115 for the shortest path from satellitei is $$T_i = \tau_i + \frac{D_i}{c},$$

where $\tau_i$ is the time of transmission, $D_i$ is the Euclidean distance between the satellites i with location $(q_i)$ and the UE 115 with location (p), c is the speed of light in the air (299700 km/s), and $q_i$ is known through the cell information database. The Euclidean distance (i.e., the line distance between two points) is given by:

$$c(T_i - \tau_i) = \sqrt{2} R \sqrt{1 - \sin(\varphi_1)\sin(\varphi_2) - \cos(\varphi_1)\cos(\varphi_2)\cos(\beta_1 - \beta_2)}, \quad \text{Eq. 1}$$

where D is the distance between two points on the surface of the earth, R is the radius of the earth (6371 km), $\varphi_1$, $\varphi_2$ is the latitude (in radians) of the first point and the latitude (in radians) of the second point, respectively, and $\beta_1$, $\beta_2$ is the longitude (in radians) of the first point and the latitude (in radians) of the second point, respectively.

In order to identify the ToA of a reference RF signal transmitted by a given network node, the UE 115 first jointly processes all the resource elements (REs) on the channel on which that network node (e.g., satellite 140) is transmitting the reference RF signal, and performs an inverse Fourier transform to convert the received RF signals to the time domain. The conversion of the received RF signals to the time domain is referred to as estimation of the Channel Energy Response (CER). The CER shows the peaks on the channel over time, and the earliest "significant" peak should therefore correspond to the ToA of the reference RF signal. Generally, a UE will use a noise-related quality threshold to filter out spurious local peaks, thereby presumably correctly identifying significant peaks on the channel. For example, a UE 115 may choose a ToA estimate that is the earliest local maximum of the CER that is at least X dB higher than the median of the CER and a maximum Y dB lower than the main peak on the channel. The UE 115 determines the CER for each reference RF signal from each network node in order to determine the ToA of each reference RF signal from the different network nodes.

A determination of the time difference of arrival between satellite 140-1 and 140-2 in FIG. 4 may locate the UE 115 on a hyperbola 402 illustrated in FIG. 3. A similar determination of the time difference of arrival between satellites 140-1 and 140-3 in FIG. 4 may similarly locate the UE 115 on a hyperbola 404 illustrated in FIG. 3. The intersection of the two hyperbolas at the point 406 in FIG. 4 may then locate the UE 115 (though typically more hyperbolas would be obtained from RSTD measurements for more pairs of satellites to remove ambiguity and reduce error in the location of UE 115).

When the UE 115 obtains a location estimate itself using OTDOA measured time differences, the necessary additional data (e.g., network nodes' locations and relative transmission timing) may be provided to the UE 115 by a location server. In some implementations, a location estimate for the UE 115 may be obtained (e.g., by the UE 115 itself or by the location server) from OTDOA measured time differences and from other measurements made by the UE 115 (e.g., measurements of signal timing from GPS or other GNSS satellites). In these implementations, known as hybrid positioning, the OTDOA measurements may contribute towards obtaining the UE's 115 location estimate but may not wholly determine the location estimate.

Figure 5:
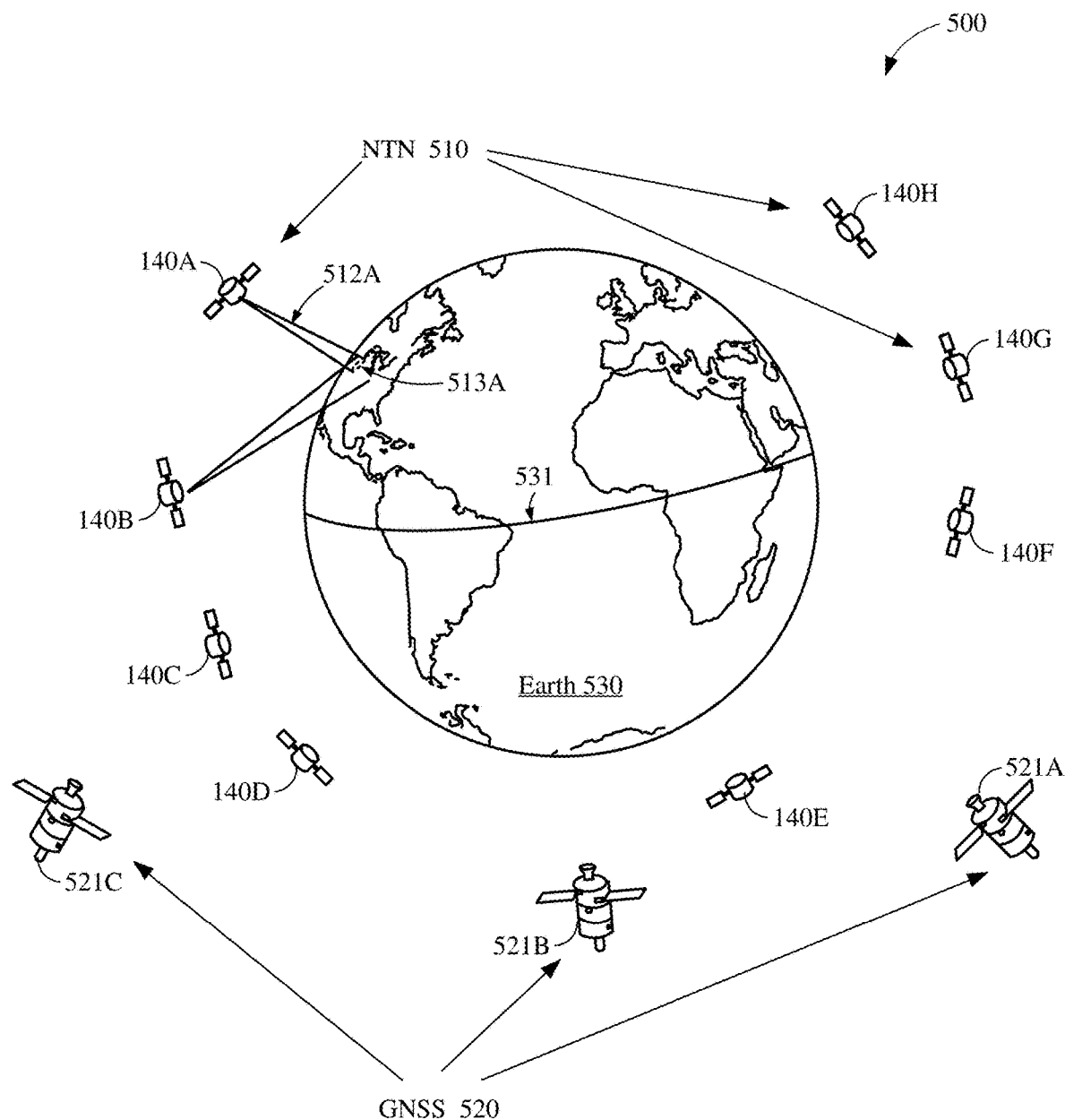
FIG. 5 shows a diagram depicting a constellation of satellites in a non-terrestrial network, and a different constellation of satellites in a Global Navigation Satellite System (GNSS).

FIG. 5 shows a diagram 500 depicting a non-terrestrial network (NTN) communication constellation 510 of satellites 510A-510H that may be part of the wireless communications system 100 shown in FIG. 1, and a GNSS constellation 520 of satellites 521A-521D, which may be part of systems such as GPS, GLONASS, Galileo or Beidou or some other local or regional Satellite Positioning System (SPS) such as IRNSS, EGNOS or WAAS. Each of satellites 510A-510H may be one example of satellite 140 of FIGS. 1 and 3. Although depicted in FIG. 5 as including only eight satellites 510A-510H, the NTN communication constellation 510 may include any suitable number of satellites, for example, to provide world-wide satellite coverage or to provide satellite coverage for selected areas. Similarly, although depicted in FIG. 5 as including only three satellites 521A-521C, the GNSS constellation 520 may include any suitable number of satellites, for example, to provide world-wide satellite coverage, and may comprise one or more GNSS systems.

The NTN communication constellation 510, may be utilized to provide satellite-based communication service to some, or most areas on Earth 530. The GNSS constellation 520, may provide a positioning service to large portions of Earth 530. The first satellite service may be differentiated from the second satellite service, at least through its use in the provision of satellite-based communication services. For some aspects, the NTN communication constellation 510 services may correspond to, e.g., 5G NR or other wireless network service, and the second satellite service provided by the GNSS constellation 520 may correspond to a satellite-based navigation, such as GPS.

In some aspects, each of the satellites 510A-510H may include a number of directional antennas to provide high-speed forward links (e.g., downlinks) with user terminals such as UE 115 of FIG. 1 and/or with gateways such as base station 105 of FIG. 1. A high-gain directional antenna achieves higher data rates and is less susceptible to interference than an omni-directional antenna by focusing radiation into a relatively narrow beam width (as compared to the relatively wide beam width associated with an omni-directional antenna). For example, as depicted in FIG. 5, the coverage area 513A provided by a beam 512A transmitted from satellite 510A may be relatively small.

Because the satellites 510A-510H are high-altitude platform, and as illustrated in FIG. 5, may be in orbit around the earth 530, the satellites are relatively far from a UE on the surface of the earth 530, e.g., compared to the distance between a UE and terrestrial base stations. The increased distance between a UE 115 and a satellite 510A, the time for a radio signal, e.g., PRS, to travel from the satellite 510A to the UE 115 is increased compared to terrestrial base stations. Consequently, a measured RSTD between a pair of satellites may be significantly greater than an RSTD measured between a pair of terrestrial base stations.

The existing PRS designed for LTE or NR, however, is not suitable for differential measurements, such as TDOA, from satellites at large distances the UE 115. In existing LTE/NR PRS design, the PRS sequences repeats every frame, i.e., every 10 ms. The PRS sequence generator for a satellite is initiated by a number which is a function of slot number within a frame. In any terrestrial network, e.g., between terrestrial base stations, an OTDOA measurement will not be larger than 5 ms (half a frame, or half of the repetition duration for a PRS). In a non-terrestrial network, however, OTDOA measurements from satellites may exceed 5 ms, more than half of the frame, or half of the repetition duration for a PRS. The possibility that a differential measurement, such as TDOA, may be greater than half of the repetition duration, creates a timing ambiguity.

Figure 6:
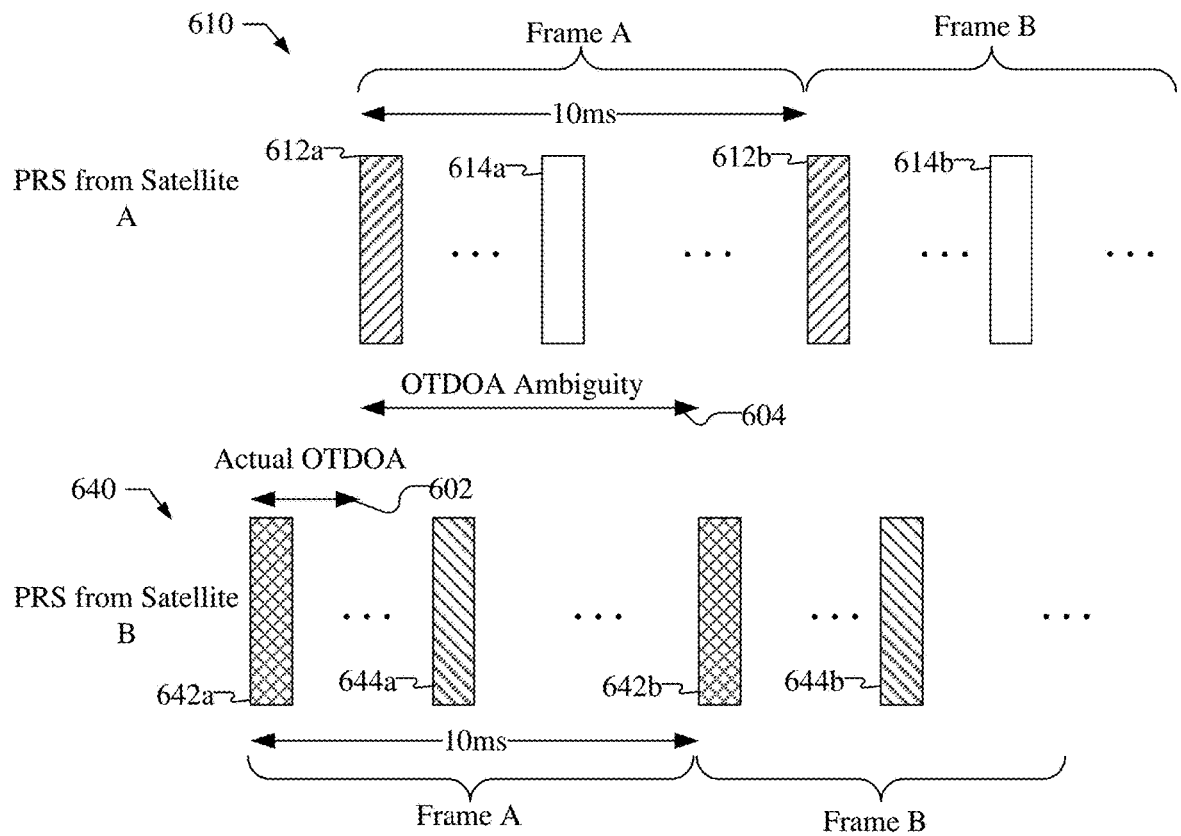
FIG. 6 illustrates the determination of a propagation delay difference between PRS received by a UE from satellites, where a frame level timing ambiguity is present.

FIG. 6 illustrates the determination of a propagation delay difference between PRS received by UE 115 from a first satellite A and a second satellite B, where a frame level timing ambiguity is present. FIG. 6, for example, illustrates PRS 610 from a satellite A and PRS 640 from a satellite B, which is received by the UE 115 over time, time being illustrated by the horizontal axis. As illustrated, PRS 610 from satellite A may include two separate PRS positioning occasions, which are repeated over frames A and B, i.e., every 10 ms. Thus, a first PRS positioning occasion is periodically transmitted every 10 ms by satellite A in frames A and B, illustrated as 612*a* and 612*b*, respectively, and a secondary PRS positioning occasions is periodically transmitted every 10 ms in frames A and B, illustrated as 614*a* and 614*b*, respectively. Similarly, PRS 640 from satellite B may include two separate PRS positioning occasions, which are repeated over frames A and B, i.e., every 10 ms. Thus, a first PRS positioning occasion is periodically transmitted every 10 ms by satellite B in frames A and B, illustrated as 642*a* and 642*b*, respectively, and secondary PRS positioning occasion 644 is periodically transmitted every 10 ms in frames A and B, illustrated as 644*a* and 644*b*, respectively.

In FIG. 6, frame A transmitted by satellite A corresponds to frame A transmitted by satellite B, i.e., they are aligned in time, although they are received at different times by the UE 115 as illustrated in FIG. 6 due to the propagation delay. Thus, PRS positioning occasion 612*a* corresponds to PRS positioning occasion 642*a*, and the actual propagation delay difference between PRS positioning occasions 612*a* and 642*a* is illustrated with arrow 602.

The PRS positioning occasions do not include any frame level identifying information. Accordingly, the UE 115 that receives PRS 610 and 640 does not know that the PRS positioning occasion 642*a* from satellite B is from a frame A that corresponds to frame A with PRS positioning occasion 612*a* from satellite A. In other words, from the UE 115 perspective, it is equally likely that frame B from satellite B corresponds to, i.e., is aligned in time with, frame A from satellite A. Moreover, because satellites are at great distances from the UE, and more specifically, because of the possibility that the propagation delay difference for PRS signals transmitted by satellites A and B may be larger than half a frame, the propagation delay difference between PRS positioning occasions 612a and 642b illustrated with arrow 604 is equally likely as the actual propagation delay difference 602 between PRS positioning occasions 612a and 642a. Accordingly, a frame level timing ambiguity in the PRS exists in the PRS 610 and 640, so that the UE 115 cannot distinguish between an OTDOA measurement of x ms or x10 ms, e.g., 4 ms or −6 ms.

To resolve the ambiguity in a propagation delay difference measurement in non-terrestrial networks, a secondary PRS may be used that provides additional timing information to resolve the frame level timing ambiguity of existing PRS.

Figure 7:
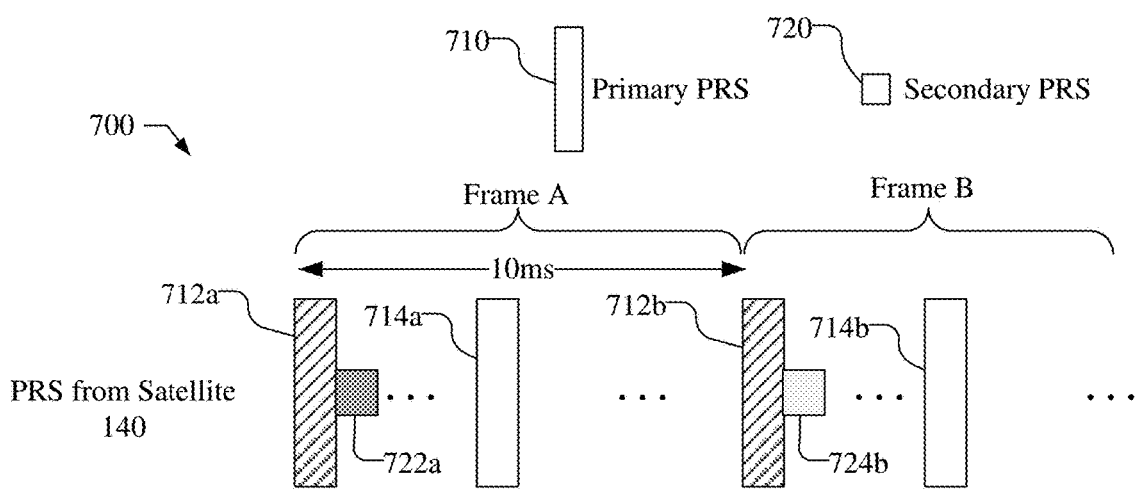
FIG. 7 illustrates PRS that may be transmitted from a satellite in a non-terrestrial network that includes primary PRS and secondary PRS that may be used to resolve the frame level timing ambiguity present in the primary PRS.

FIG. 7, by way of example, illustrates PRS 700 that may be transmitted from a satellite 140 in a non-terrestrial network, such as illustrated in FIG. 1. The PRS 700 include a primary PRS 710 that is transmitted periodically with one or more primary PRS positioning occasions per frame. The PRS 700 also includes a secondary PRS 720 that is transmitted periodically with one or more secondary PRS positioning occasions per frame and provides timing information to resolve frame level timing ambiguity of the primary PRS. FIG. 7 illustrates, for example, the primary PRS 710 may include two separate PRS positioning occasions, with a first PRS positioning occasion periodically transmitted in frames A and B, illustrated as 712a and 712b, respectively, and a secondary PRS positioning occasion periodically transmitted every in frames A and B, illustrated as 714a and 714b, respectively. The secondary PRS 720 includes a first secondary PRS positioning occasion 722a in frame A that is periodically transmitted, and a second secondary PRS positioning occasion 724b in frame B that is periodically transmitted.

The primary PRS 710 may be existing PRS, e.g., designed for LTE or NR. As illustrated with shading in the primary PRS 710 in FIG. 7, the first PRS positioning occasions and secondary PRS positioning occasions repeat every frame, i.e., PRS positioning occasions 712a and 712b contain the same information and PRS positioning occasions 714a and 714b contain the same information. The primary PRS 710 may be used for differential positioning measurements, such as TDOA, and provide support for fine positioning measurements, less than 5 ms, but suffer from frame level timing ambiguity, as discussed above.

The secondary PRS 720 provides timing information to resolve the frame level timing ambiguity of the primary PRS 710. Thus, the secondary PRS 720 carries timing that may be used to resolve ambiguities greater than 5 ms. For example, as illustrated with shading of the secondary PRS 720 in FIG. 7, the PRS positioning occasions in adjacent frames, i.e., PRS positioning occasions 722a and 724b, contain different information. The periodicity of the secondary PRS 720 may be, but is not necessarily, aligned with that of the primary PRS 710, e.g., for simpler association between the propagation delay difference obtained from the primary PRS 710 and the additional timing information from the secondary PRS 720. For example, each secondary PRS positioning occasion may be aligned with a corresponding primary PRS positioning occasion within each frame, e.g., secondary PRS positioning occasions 722a and 724b are aligned with corresponding primary PRS positioning occasions 712a and 712b, respectively.

The timing information carried by the secondary PRS 720 may be any information that conveys frame level information. For example, in one implementation, the timing information carried by the secondary PRS 720 may be related to the radio frame number. For example, the secondary PRS 720 may carry the radio frame number modulo x, where x may be selected based on the periodicity of the secondary PRS 720, e.g., x may be 2 in the present example. In another implementation, the timing information carried by the secondary PRS 720 may be related to the primary PRS 710 burst index. For example, the secondary PRS 720 may carry the primary PRS burst index modulo x, where again x may be selected based on the periodicity of the secondary PRS 720, e.g., x may be 2 in the present example. The secondary PRS 720, for example, may be generated by the satellite 140 by initializing a state of a secondary PRS sequence generator as a function of the radio frame number or the primary PRS 710 burst index. The timing information carried by the secondary PRS 720 may be any other information that may be used to resolve the frame level timing ambiguity in the primary PRS 710.

The satellite 140 may provide parameters for the secondary PRS 720 to the UE 115, e.g., in a Radio Resource Control (RRC) configuration so that the UE 115 can detect the secondary PRS 720. In some implementations, one parameter for the secondary PRS that may be transmitted by the satellite 140 in the RRC configurations may be an indication of the deployment of the secondary PRS for the non-terrestrial network, whereas a terrestrial base station 105, e.g., in a terrestrial network, may provide an indication of non-deployment of the secondary PRS.

The primary PRS 710 and the secondary PRS 720 may be multiplexed in the time domain or frequency domain. For example, a satellite may multiplex the primary PRS 710 and the secondary PRS 720 in the time domain, e.g., by transmitting the primary PRS occasions 712a, 712b and the corresponding secondary PRS occasions 722a, 722b in different symbols within each frame. A satellite may multiplex the primary PRS 710 and the secondary PRS 720 in the frequency domain, e.g., by transmitting the primary PRS occasions 712a, 712b and the corresponding secondary PRS occasions 722a, 722b in a same symbol, but with non-overlapping resource elements.

Additionally, it should be understood that the primary PRS 710 and the secondary PRS 720 are transmitted by the same satellite 140 and are quasi co-located. The radio channel properties that may be common across the antenna ports that transmit the primary PRS 710 and the secondary PRS 720 includes Doppler spread/shift, average delay, delay spread, average gain and spatial receiver parameters.

Figure 8:
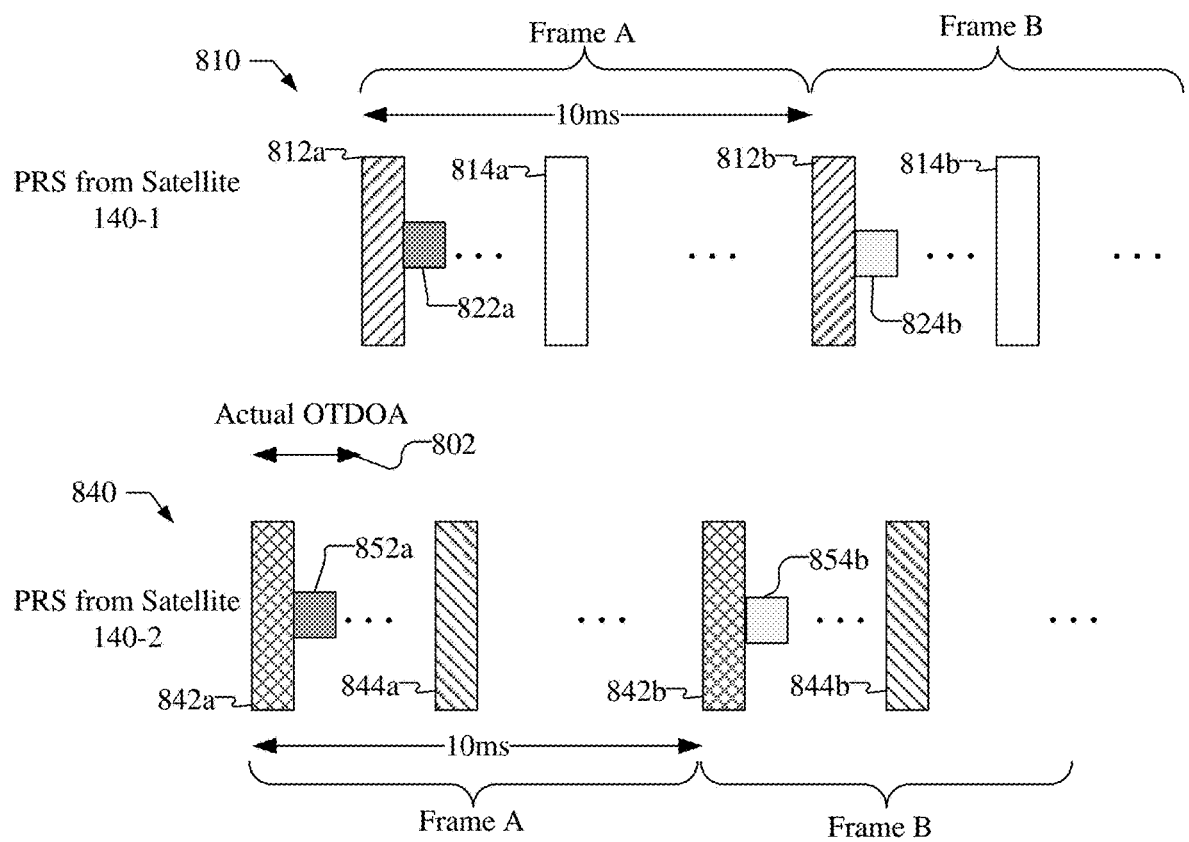
FIG. 8 illustrates the determination of a propagation delay difference between PRS received by UE from satellites, where a frame level timing ambiguity is resolved using secondary PRS.

FIG. 8 illustrates the determination of a propagation delay difference between PRS received by UE 115 from a first satellite 140-1 and a second satellite 140-1, where a frame level timing ambiguity is resolved using secondary PRS. FIG. 8, for example, illustrates PRS 810 from a satellite 14-1 and PRS 840 from a satellite 140-2, which is received by the UE 115 over time, time being illustrated by the horizontal axis.

As illustrated, PRS 810 from satellite 140-1 may include a first primary PRS positioning occasion that is periodically transmitted every 10 ms in frames A and B, illustrated as 812a and 812b, respectively, and a second primary PRS positioning occasion 814 that is periodically transmitted every 10 ms in frames A and B, illustrated as 814a and 814b, respectively. Satellite 140-1 also transmits a first secondary PRS positioning occasion 822a, e.g., aligned with corresponding first primary PRS positioning occasion 812a in frame A, and a second secondary PRS positioning occasion 824*b*, e.g., aligned with corresponding first primary PRS positioning occasion 812*b* in frame B.

PRS 840 from satellite 140-2 may include a first primary PRS positioning occasions that is periodically transmitted every 10 ms in frames A and B, illustrated as 842*a* and 842*b*, respectively, and a second primary PRS positioning occasion 844 that is periodically transmitted every 10 ms in frames A and B, illustrated as 844*a* and 844*b* respectively. Satellite 140-1 also transmits a first secondary PRS positioning occasion 852*a*, e.g., aligned with corresponding first primary PRS positioning occasion 842*a* in frame A, and a second secondary PRS positioning occasion 854*b*, e.g., aligned with corresponding first primary PRS positioning occasion 842*b* in frame B.

In FIG. 8, frame A transmitted by satellite 140-1 corresponds to frame A transmitted by satellite 140-2, i.e., they are aligned in time, although they are received at different times by the UE 115 as illustrated in FIG. 8 due to the propagation delay. Thus, PRS positioning occasion 812*a* corresponds to PRS positioning occasion 842*a*, and the actual propagation delay difference between PRS positioning occasions 812*a* and 842*a* is illustrated with arrow 802.

The secondary PRS transmitted by satellites 140-1 and 140-2 provide timing information to resolve the frame level timing ambiguity of the primary PRS. Consequently, based on the information provided by the secondary PRS, the UE 115 may determine corresponding frames from satellite 140-1 and 140-2, and thus, UE 115 may determine that primary PRS positioning occasion 812*a* from frame A transmitted by satellite 140-1 corresponds with primary PRS positioning occasion 842*a* from frame A transmitted by satellite 140-2. Accordingly, UE 115 may determine the actual propagation delay difference 802 without ambiguity.

Figure 9:
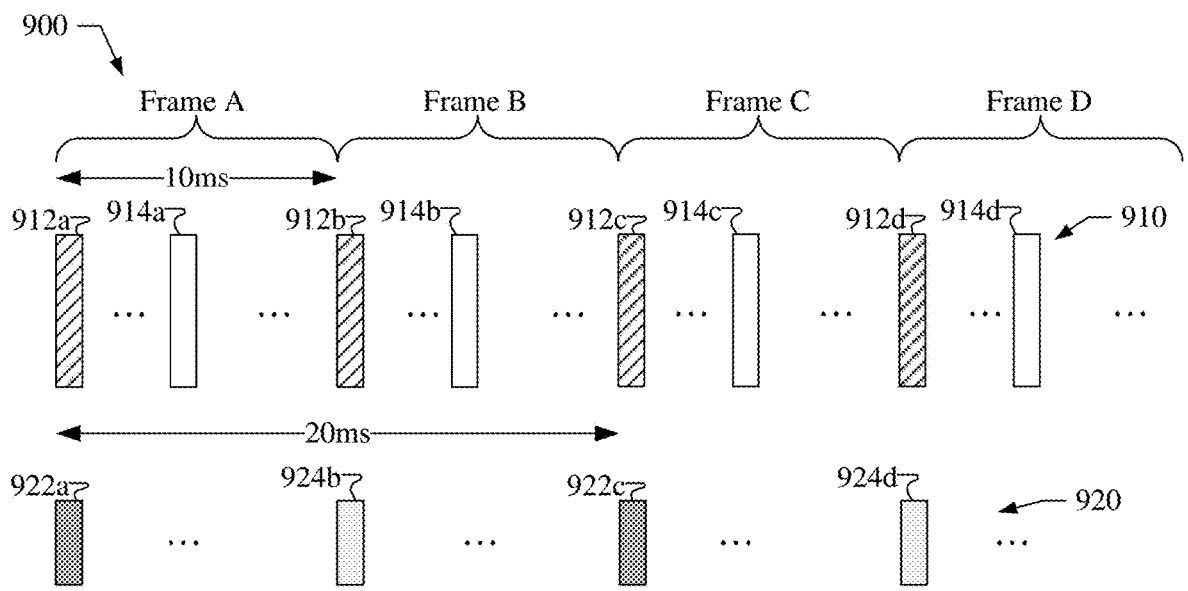
FIG. 9 illustrates PRS that may be transmitted from a satellite in a non-terrestrial network, where the periodicity of the secondary PRS is an integer multiple (greater than 1) of the periodicity of the primary PRS and there are fewer secondary PRS positioning occasions transmitted per frame as primary PRS positioning occasions.

FIG. 9 illustrates PRS 900, which may be transmitted from a satellite 140 in a non-terrestrial network, where the periodicity of the secondary PRS 920 is an integer multiple (greater than 1) of the periodicity of the primary PRS 910. While the primary PRS 910 is illustrated separately from secondary PRS 920 in FIG. 9, it should be understood that the primary PRS 910 and the secondary PRS 920 are transmitted from the same satellite 140, are quasi co-located, and may be multiplexed in the time domain or frequency domain.

The primary PRS 910 is transmitted periodically with one or more primary PRS positioning occasions per frame. For example, as illustrated, two primary PRS positioning occasions are transmitted per frame, a first primary PRS positioning occasion is transmitted in each frame A, B, C, and D, illustrated as primary PRS positioning occasions 912*a*, 912*b*, 912*c*, and 912*d*, respectively, and a second primary PRS positioning occasion is transmitted in each frame, illustrated as primary PRS positioning occasions 914*a*, 914*b*, 914*c*, and 914*d*, respectively.

The periodicity of the secondary PRS 920 is an integer multiple, e.g., 2*x* in this example, of the periodicity of the primary PRS 910. Thus, as illustrated in FIG. 9, a first secondary PRS positioning occasion may be transmitted in each frames A and C, illustrated as secondary PRS positioning occasions 922*a* and 922*c*, respectively, and a second secondary PRS positioning occasion may be transmitted in frame B and D, illustrated as secondary PRS positioning occasions 924*b* and 924*d*, respectively. Thus, as illustrated, a secondary PRS positioning occasion may be transmitted once per periodicity of the primary PRS. As illustrated in FIG. 9, there may be fewer secondary PRS positioning occasions transmitted per frame than primary PRS positioning occasions.

Figure 10:
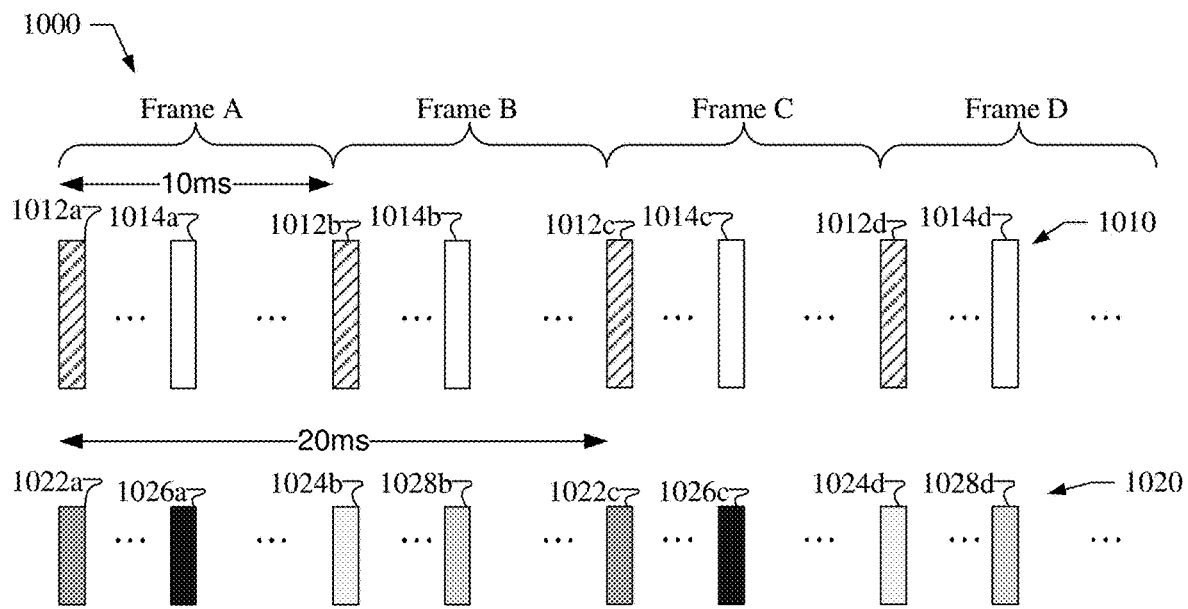
FIG. 10 illustrates PRS that may be transmitted from a satellite in a non-terrestrial network, where there is a same number of secondary PRS positioning occasions transmitted per frame as primary PRS positioning occasions.

FIG. 10 is similar to FIG. 9 and illustrates PRS 1000 transmitted from a satellite 140 in a non-terrestrial network, where a same number of secondary PRS positioning occasions are transmitted per frame as primary PRS positioning occasions. Similar to FIG. 9, while the primary PRS 1010 is illustrated separately from secondary PRS 1020 in FIG. 10, it should be understood that the primary PRS 1010 and the secondary PRS 1020 are transmitted from the same satellite 140, are quasi co-located, and may be multiplexed in the time domain or frequency domain.

The primary PRS 1010 is transmitted periodically with one or more primary PRS positioning occasions per frame. For example, as illustrated, two primary PRS positioning occasions are transmitted per frame, a first primary PRS positioning occasion is in each frame A, B, C, and D, illustrated as primary PRS positioning occasions 1012*a*, 1012*b*, 1012*c*, and 1012*d*, respectively, and a second primary PRS positioning occasion may be transmitted in each frame, illustrated as primary PRS positioning occasions 1014*a*, 1014*b*, 1014*c*, and 1014*d*, respectively.

As illustrated in FIG. 10, two secondary PRS positioning occasions may also be transmitted per frame. First and second secondary PRS positioning occasions may be transmitted in each frames A and C, illustrated as secondary PRS positioning occasions 1022*a*, 1022*c*, and 1026*a*, 1026*c*, respectively. Additionally, different secondary PRS positioning occasion may be transmitted in frames B and D, illustrated as secondary PRS positioning occasions 1024*b*, 1024*d* and 1028*b*, 1028*d*, respectively. Thus, as illustrated, a secondary PRS positioning occasion may be transmitted for each of the one or more primary PRS positioning occasions per frame.

Figure 11:
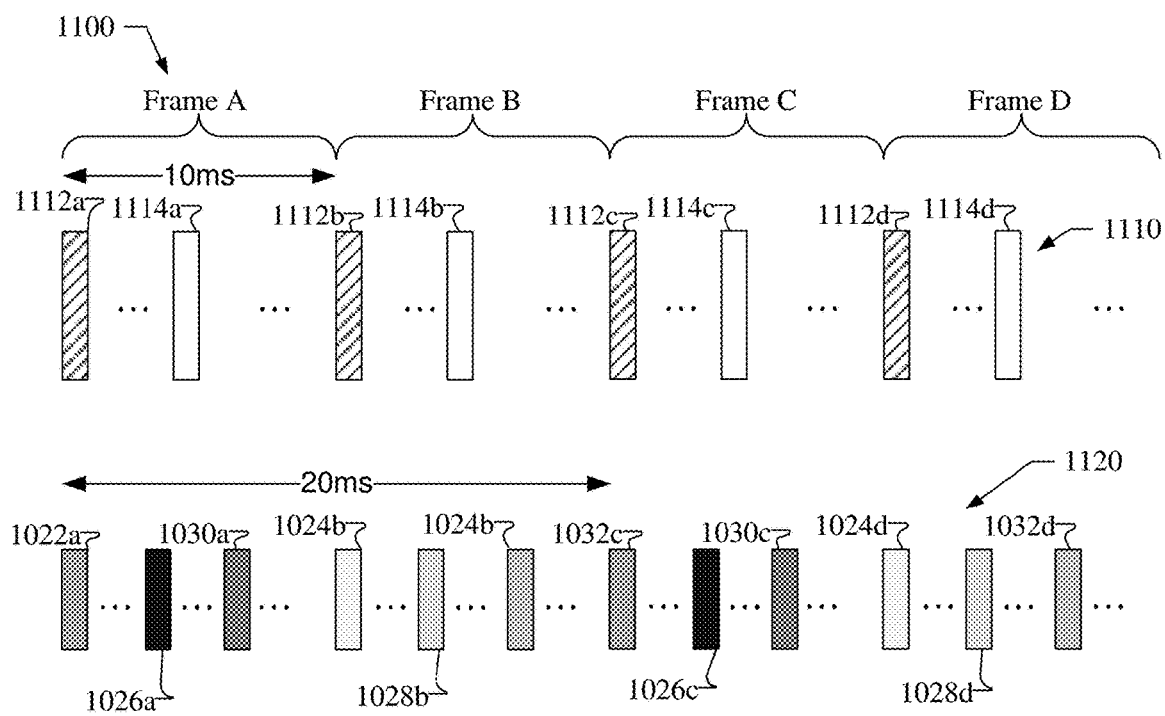
FIG. 11 illustrates PRS that may be transmitted from a satellite in a non-terrestrial network, where there is a greater number of secondary PRS positioning occasions transmitted per frame as primary PRS positioning occasions.

FIG. 11 is similar to FIG. 9 and illustrates PRS 1100 transmitted from a satellite 140 in a non-terrestrial network, where a greater number of secondary PRS positioning occasions are transmitted per frame as primary PRS positioning occasions. Similar to FIG. 9, while the primary PRS 1110 is illustrated separately from secondary PRS 1120 in FIG. 11, it should be understood that the primary PRS 1110 and the secondary PRS 1120 are transmitted from the same satellite 140, are quasi co-located, and may be multiplexed in the time domain or frequency domain.

The primary PRS 1110 is transmitted periodically with one or more primary PRS positioning occasions per frame. For example, as illustrated, two primary PRS positioning occasions are transmitted per frame, a first primary PRS positioning occasion is in each frame A, B, C, and D, illustrated as primary PRS positioning occasions 1112*a*, 1112*b*, 1112*c*, and 1112*d*, respectively, and a second primary PRS positioning occasion may be transmitted in each frame, illustrated as primary PRS positioning occasions 1114*a*, 1114*b*, 1114*c*, and 1114*d*, respectively.

As illustrated in FIG. 11, three secondary PRS positioning occasions may also be transmitted per frame. First, second and third secondary PRS positioning occasions may be transmitted in each frames A and C, illustrated as secondary PRS positioning occasions 1122*a*, 1122*c*; 1126*a*, 1126*c*; and 1130*a*, 1130*c*, respectively. Additionally, different secondary PRS positioning occasion may be transmitted in frames B and D, illustrated as secondary PRS positioning occasions 1124*b*, 1124*d*; 1128*b*, 1128*d*; and 1132*b*, 1132*d*, respectively. Thus, as illustrated, multiple secondary PRS positioning occasions may be transmitted for each primary PRS positioning occasion per frame.

Figure 12:
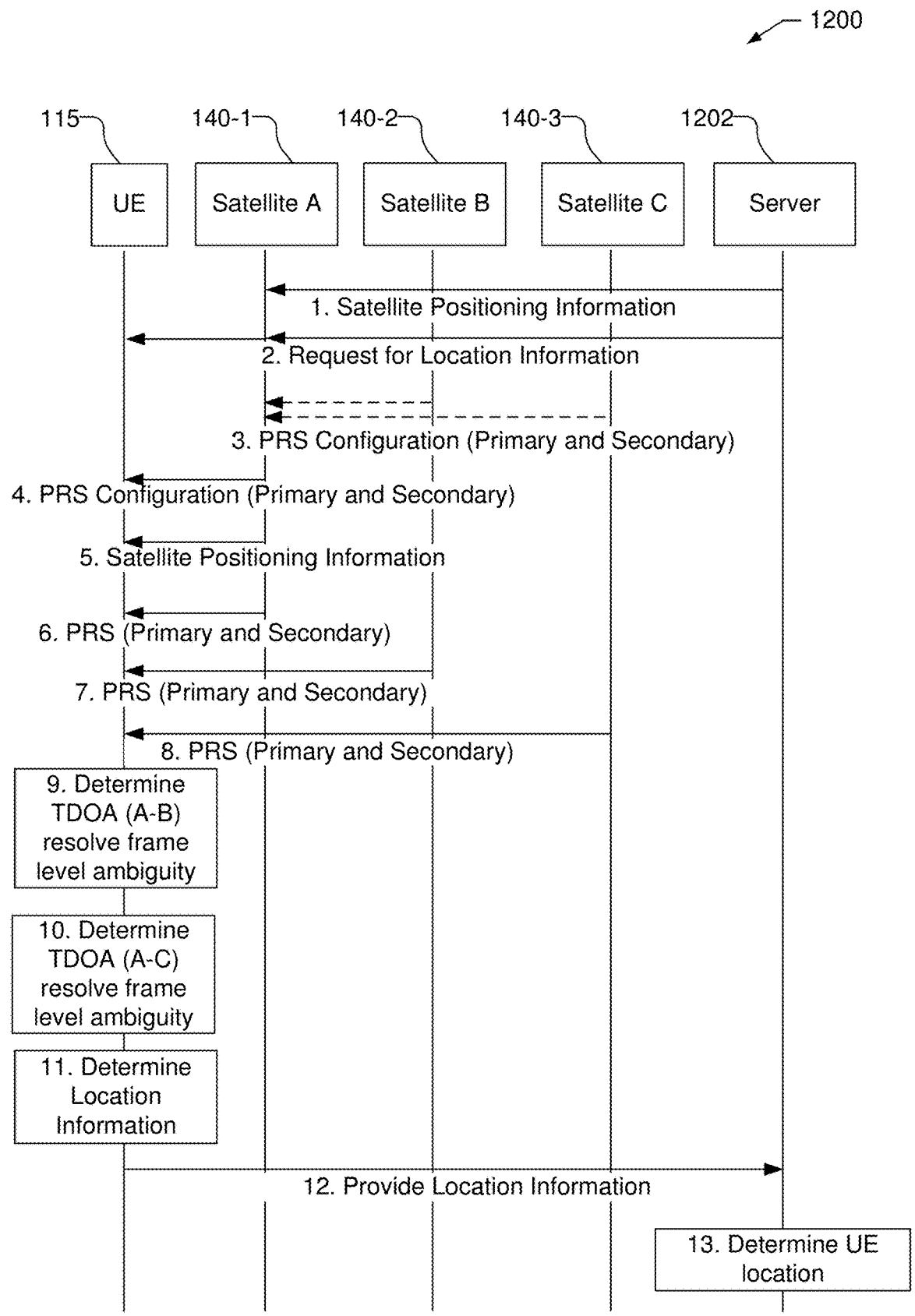
FIG. 12 shows a signaling flow that illustrates various messages sent between components of the non-terrestrial communication network for position determination of a UE based on propagation delay difference measurements of PRS transmitted by satellites in a non-terrestrial network.

FIG. 12 shows a signaling flow 1200 that illustrates various messages sent between components of the non-terrestrial communication system 100 depicted in FIG. 1. FIG. 12 illustrates an OTDOA positioning procedure performed by a UE 115 using primary PRS and secondary PRS transmitted by satellites 140-1, 140-2, and 140-3, sometimes collectively referred to as satellites 140. There may be one or more preliminary stages not shown, such as capabilities request and response, a positioning request, etc.

At stage 1, a server 1202, which may be the location server 196 or a separate server, may provide satellite positioning information to a serving satellite 140-1 for the UE 115. The satellite positioning information, for example, may include the positions, velocities, and directions of one or more satellites, which may include satellites 140-1, 140-2 and 140-3. Additionally, the server 1202 may provide to the serving satellite 140-1 PRS configurations, including primary and secondary PRS configurations, for satellites 140-2 and 140-3. For example, satellites 140-2 and 14-3 may convey such information to server in a preliminary stage.

At stage 2, the server 1202, or a separate server, such as location server 196, may send a Request for Location Information message to the UE 115 through the serving satellite 140-1 to request RSTD measurements. The message may include, e.g., the type of location measurements, the desired accuracy, response time, etc.

At optional stage 3, satellites 140-2 and 140-3 may provide their PRS configuration, for both primary PRS and secondary PRS, to the serving satellite 140-1 if the serving satellite 14-1 did not previously acquire this information, e.g., from server 1202 in stage 1.

At stage 4, serving satellite 140-1 may send the PRS configuration, including the configurations for the primary PRS and the secondary PRS for the serving satellite 140-1 and neighboring satellites 140-2, and 140-3, to the UE 115. PRS configurations provides information to the UE 115 so that UE 115 may search for and detect the primary PRS and secondary PRS from the satellites 140. The PRS configurations may be sent in an RRC message. The configuration for the secondary PRS may be sent to the UE 115 in the same message or a different message than that used to send the primary PRS configuration. Included in the PRS configuration information may be an indication of the deployment or non-deployment of the secondary PRS.

At stage 5, in some implementations, the serving satellite 140-1 may provide satellite positioning information to the UE 115, such as the positions, velocities, and directions of the satellites 140-1, 140-2 and 140-3. The satellite positioning information may be provided in an RRC message. In some implementations, the satellite positioning information from stage 5 may be combined in the same message as the PRS configuration from stage 4. The satellite positioning information for the satellites 140 may be used by the UE 115 in a UE based positioning method to generate a position estimate.

At stage 6, satellite 140-1 transmits PRS signals, including primary PRS and secondary PRS, e.g., as discussed in FIGS. 7-11. The primary PRS is transmitted periodically with one or more primary PRS positioning occasions per radio frame. The secondary PRS is also transmitted periodically, which may be, e.g., an integer multiple (greater than 1) of the periodicity of the primary PRS. The secondary PRS includes one or more secondary PRS positioning occasions per radio frame and provides timing information to resolve frame level timing ambiguity of the primary PRS. The positioning occasions in the secondary PRS may be aligned with corresponding positioning occasions in the primary PRS. Moreover, there may be fewer, the same number or more positioning occasions in the secondary PRS than in the primary PRS. The primary PRS and the secondary PRS may be quasi co-located. The timing information provided by the secondary PRS may include information related to the radio frame number or primary PRS burst index, etc. For example, the secondary PRS may be generated by initializing a state of a secondary PRS sequence generator as a function of one of a radio frame number or a primary PRS burst index. The primary PRS and the secondary PRS may be time division multiplexed (TDM) or frequency division multiplexed (FDM).

At stage 7, satellite 140-2 transmits PRS signals, including primary PRS and secondary PRS, e.g., as discussed in FIGS. 7-11. The primary PRS is transmitted periodically with one or more primary PRS positioning occasions per radio frame. The secondary PRS is also transmitted periodically, which may be, e.g., an integer multiple (greater than 1) of the periodicity of the primary PRS. The secondary PRS includes one or more secondary PRS positioning occasions per radio frame and provides timing information to resolve frame level timing ambiguity of the primary PRS. The positioning occasions in the secondary PRS may be aligned with corresponding positioning occasions in the primary PRS. Moreover, there may be fewer, the same number or more positioning occasions in the secondary PRS than in the primary PRS. The primary PRS and the secondary PRS may be quasi co-located. The timing information provided by the secondary PRS may include information related to the radio frame number or primary PRS burst index, etc. For example, the secondary PRS may be generated by initializing a state of a secondary PRS sequence generator as a function of one of a radio frame number or a primary PRS burst index. The primary PRS and the secondary PRS may be time division multiplexed (TDM) or frequency division multiplexed (FDM).

At stage 8, satellite 140-3 transmits PRS signals, including primary PRS and secondary PRS, e.g., as discussed in FIGS. 7-11. The primary PRS is transmitted periodically with one or more primary PRS positioning occasions per radio frame. The secondary PRS is also transmitted periodically, which may be, e.g., an integer multiple (greater than 1) of the periodicity of the primary PRS. The secondary PRS includes one or more secondary PRS positioning occasions per radio frame and provides timing information to resolve frame level timing ambiguity of the primary PRS. The positioning occasions in the secondary PRS may be aligned with corresponding positioning occasions in the primary PRS. Moreover, there may be fewer, the same number or more positioning occasions in the secondary PRS than in the primary PRS. The primary PRS and the secondary PRS may be quasi co-located. The timing information provided by the secondary PRS may include information related to the radio frame number or primary PRS burst index, etc. For example, the secondary PRS may be generated by initializing a state of a secondary PRS sequence generator as a function of one of a radio frame number or a primary PRS burst index. The primary PRS and the secondary PRS may be time division multiplexed (TDM) or frequency division multiplexed (FDM).

At stage 9, the UE 115 may determine differential positioning measurements, such as a time difference of arrival (TDOA) measurement using primary PRS from satellites 140-1 and 140-2, where the secondary PRS is used to resolve frame level ambiguity.

At stage 10, the UE 115 may determine differential positioning measurements, such as a time difference of arrival (TDOA) measurement using primary PRS from satellites 140-1 and 140-3, where the secondary PRS is used to resolve frame level ambiguity.

At optional stage 11, the UE 115 may determine the location information for the UE 115. For example, the location information may be the TDOA measurements determined for each satellite pair, e.g., at stages 9 and 10. In some implementations, the location information may be a position for the UE 115 determined in a UE based positioning procedure using the determined differential positioning measurements from stages 9 and 10, and satellite position information for the satellites 140 received in stage 5.

At stage 12, the UE 115 provides location information to the location server 196, e.g., via the serving satellite 140-1 and other intervening elements. The location information, for example, may be the desired positioning measurement from stage 11 if performed. In some implementations, the UE 115 may additionally or alternatively provide the differential positioning measurements from stages 9 and 10.

At stage 13, the location server 196 may determine or confirm the position of the UE 115 using the location information received at stage 12.

Figure 13:
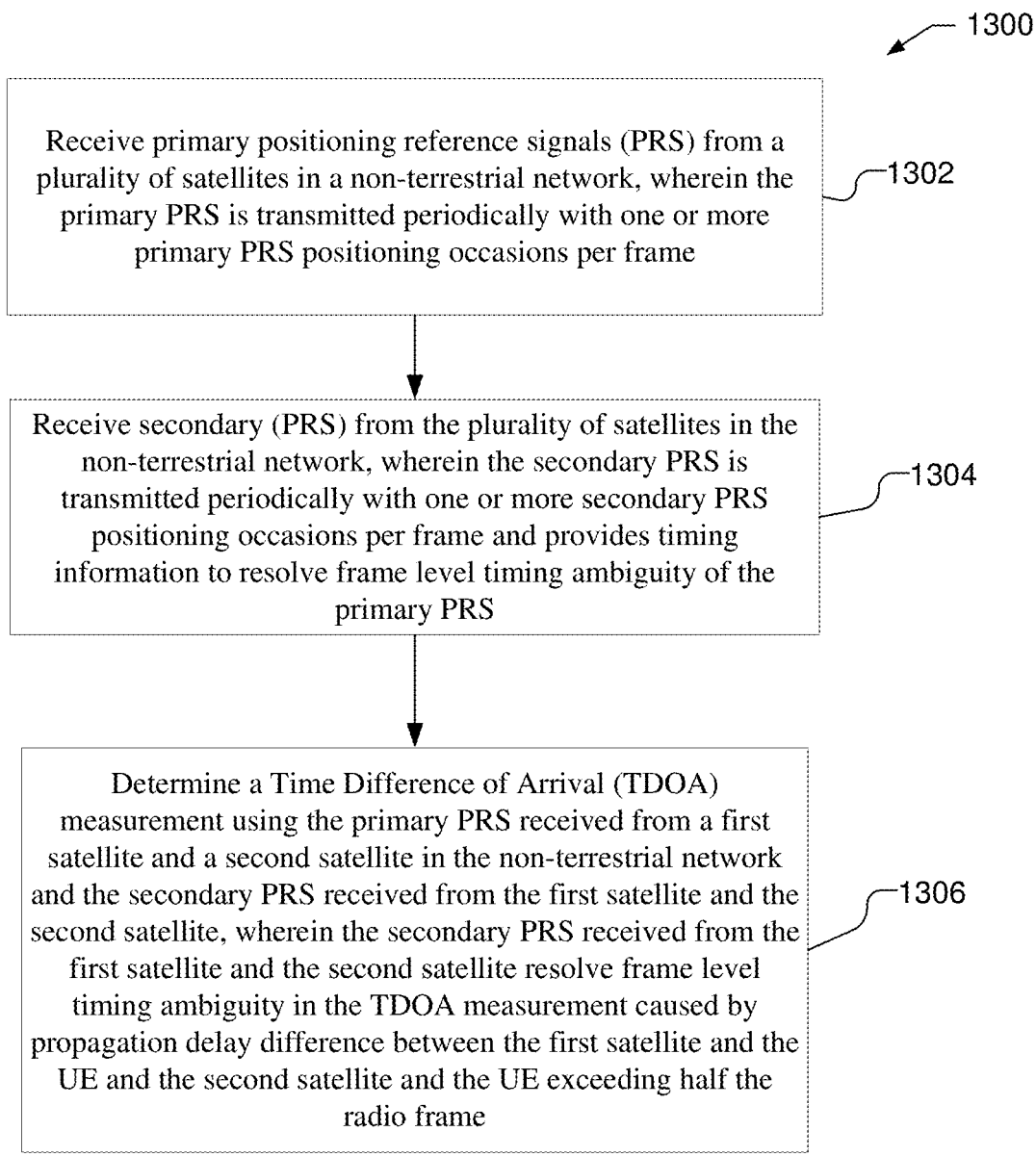
FIG. 13 shows a flowchart of an example procedure performed by a UE for supporting position determination of the UE based on propagation delay difference measurements of PRS transmitted by satellites in a non-terrestrial network.

FIG. 13 shows a flowchart of an example procedure 1300 for supporting positioning of a UE, performed by the UE, and in particular for performing Time Difference of Arrival (TDOA) measurements using PRS from satellites in a non-terrestrial network, such as satellites 140 shown in FIGS. 1, 4, 5, and 12.

As illustrated, at block 1302, the UE receives primary positioning reference signals (PRS) from a plurality of satellites in a non-terrestrial network, wherein the primary PRS is transmitted periodically with one or more primary PRS positioning occasions per radio frame, e.g., as illustrated in FIGS. 7-11, and stages 6, 7, and 8 of FIG. 12. At block 1304, secondary PRS are received from the plurality of satellites in the non-terrestrial network, wherein the secondary PRS is transmitted periodically with one or more secondary PRS positioning occasions per radio frame and provides timing information to resolve frame level timing ambiguity of the primary PRS, e.g., as illustrated in FIGS. 7-11, and stages 6, 7, and 8 of FIG. 12. At block 1306, a Time Difference of Arrival (TDOA) measurement is determined using the primary PRS received from a first satellite and a second satellite in the non-terrestrial network and the secondary PRS received from the first satellite and the second satellite, wherein the secondary PRS received from the first satellite and the second satellite resolve frame level timing ambiguity in the TDOA measurement caused by propagation delay difference between the satellite and the UE and the second satellite and the UE exceeding half the radio frame, e.g., as illustrated in FIG. 8, and stages 9 and 10 of FIG. 12.

In one implementation, each secondary PRS positioning occasion is aligned with a corresponding primary PRS positioning occasion within each radio frame, e.g., as discussed in reference to FIG. 7 and stages 6, 7, and 8 of FIG. 12.

In one implementation, a periodicity of the secondary PRS is an integer multiple of a periodicity of the primary PRS, wherein the integer multiple is greater than 1, e.g., as discussed in reference to FIGS. 7 and 9 and stages 6, 7, and 8 of FIG. 12.

In one implementation, a same number of secondary PRS positioning occasions are transmitted per radio frame as primary PRS positioning occasions, e.g., as discussed in reference to FIG. 1 and stages 6, 7, and 8 of FIG. 120.

In one implementation, fewer secondary PRS positioning occasions are transmitted per radio frame than primary PRS positioning occasions, e.g., as discussed in reference to FIG. 9 and stages 6, 7, and 8 of FIG. 12.

In one implementation, more secondary PRS positioning occasions are transmitted per radio frame than primary PRS positioning occasions, as discussed in reference to FIG. 11 and stages 6, 7, and 8 of FIG. 12.

In one implementation, the timing information provided by the secondary PRS comprises information may be related to at least one of radio frame number or primary PRS burst index, e.g., as discussed in reference to FIG. 7 and stages 6, 7, and 8 of FIG. 12.

In one implementation, Radio Resource Control (RRC) configurations may be received by the UE that provide configurations for the secondary PRS, e.g., as discussed in reference to FIG. 7 and stage 4 of FIG. 12. In one implementation, a parameter for the secondary PRS received in the RRC configurations may be an indication of deployment of the secondary PRS for the non-terrestrial network or non-deployment of the secondary PRS for a terrestrial network, e.g., as discussed in reference to FIG. 7 and stage 4 of FIG. 12.

In one implementation, the primary PRS and the secondary PRS may be multiplexed in time domain by transmitting the primary PRS occasions and the secondary PRS occasions in different symbols or are multiplexed in frequency domain by transmitting the primary PRS occasions and the secondary PRS occasions in a same symbol but with non-overlapping resource elements, e.g., as discussed in reference to FIG. 7 and stages 6, 7, and 8 of FIG. 12.

In one implementation, the primary PRS and the secondary PRS from each satellite in the non-terrestrial network are quasi co-located, e.g., as discussed in reference to FIG. 7 and stages 6, 7, and 8 of FIG. 12.

Figure 14:
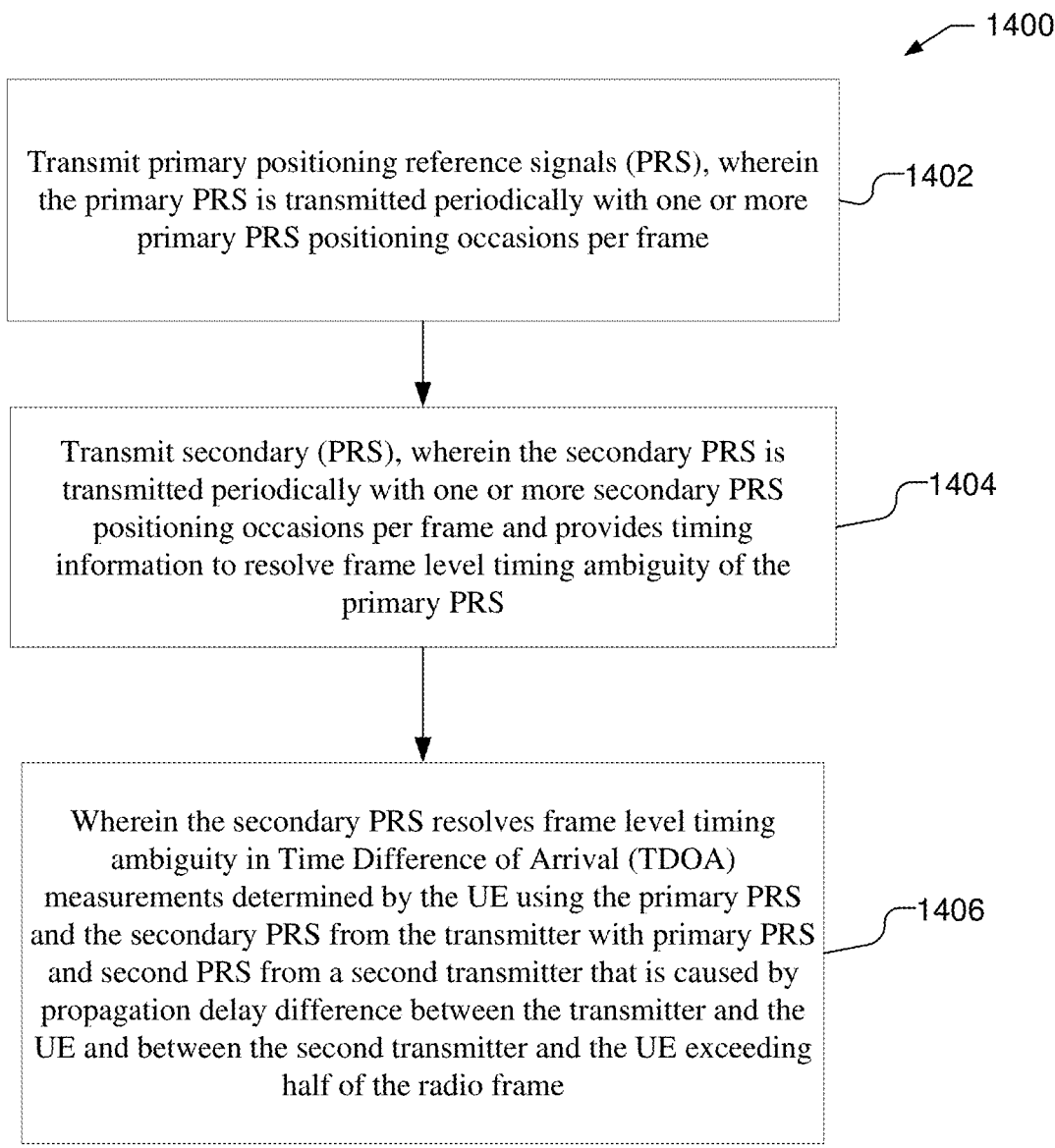
FIG. 14 shows a flowchart of an example procedure performed by a satellite for supporting position determination of the UE based on propagation delay difference measurements of PRS transmitted by satellites in the non-terrestrial network.

FIG. 14 shows a flowchart of an example procedure 1400 for supporting positioning of a UE, performed by a satellite in a non-terrestrial network, such as satellite 140, shown in FIGS. 1, 4, 5, and 12.

As illustrated, at block 1402, the satellite transmits transmitting primary positioning reference signals (PRS), wherein the primary PRS is transmitted periodically with one or more primary PRS positioning occasions per radio frame, e.g., as illustrated in FIGS. 7-11, and stages 6, 7, and 8 of FIG. 12. At block 1404, secondary PRS are transmitted, wherein the secondary PRS is transmitted periodically with one or more secondary PRS positioning occasions per radio frame and provides timing information to resolve frame level timing ambiguity of the primary PRS, e.g., as illustrated in FIGS. 7-11, and stages 6, 7, and 8 of FIG. 12. As illustrated by block 1406, the secondary PRS resolves frame level timing ambiguity in Time Difference of Arrival (TDOA) measurements determined by the UE using the primary PRS and the secondary PRS from the satellite with primary PRS and secondary PRS from a second satellite that is caused by propagation delay difference between the satellite and the UE and between the second satellite and the UE exceeding half of the radio frame, e.g., as illustrated in FIG. 8, and stages 9 and 10 of FIG. 12.

In one implementation, each secondary PRS positioning occasion is aligned with a corresponding primary PRS positioning occasion within each radio frame, e.g., as discussed in reference to FIG. 7 and stages 6, 7, and 8 of FIG. 12.

In one implementation, a periodicity of the secondary PRS is an integer multiple of a periodicity of the primary PRS, wherein the integer multiple is greater than 1, e.g., as discussed in reference to FIGS. 7 and 9 and stages 6, 7, and 8 of FIG. 12.

In one implementation, a same number of secondary PRS positioning occasions are transmitted per radio frame as primary PRS positioning occasions, e.g., as discussed in reference to FIG. 1 and stages 6, 7, and 8 of FIG. 120.

In one implementation, fewer secondary PRS positioning occasions are transmitted per radio frame than primary PRS positioning occasions, e.g., as discussed in reference to FIG. 9 and stages 6, 7, and 8 of FIG. 12.

In one implementation, more secondary PRS positioning occasions are transmitted per radio frame than primary PRS positioning occasions, as discussed in reference to FIG. 11 and stages 6, 7, and 8 of FIG. 12.

In one implementation, the timing information provided by the secondary PRS comprises information may be related to at least one of radio frame number or primary PRS burst index, e.g., as discussed in reference to FIG. 7 and stages 6, 7, and 8 of FIG. 12. For example, in one implementation, the satellite generates the secondary PRS by initializing a state of a secondary PRS sequence generator as a function of one of a radio frame number or a primary PRS burst index.

In one implementation, the satellite may transmit Radio Resource Control (RRC) configurations that provide parameters for the secondary PRS, e.g., as discussed in reference to FIG. 7 and stage 4 of FIG. 12. In one implementation, a parameter for the secondary PRS received in the RRC configurations may be an indication of deployment of the secondary PRS for the non-terrestrial network or non-deployment of the secondary PRS for a terrestrial network, e.g., as discussed in reference to FIG. 7 and stage 4 of FIG. 12.

In one implementation, the primary PRS and the secondary PRS may be multiplexed in time domain by transmitting the primary PRS occasions and the secondary PRS occasions in different symbols or are multiplexed in frequency domain by transmitting the primary PRS occasions and the secondary PRS occasions in a same symbol but with non-overlapping resource elements, e.g., as discussed in reference to FIG. 7 and stages 6, 7, and 8 of FIG. 12.

In one implementation, the primary PRS and the secondary PRS from each satellite in the non-terrestrial network are quasi co-located, e.g., as discussed in reference to FIG. 7 and stages 6, 7, and 8 of FIG. 12.

Figure 15:
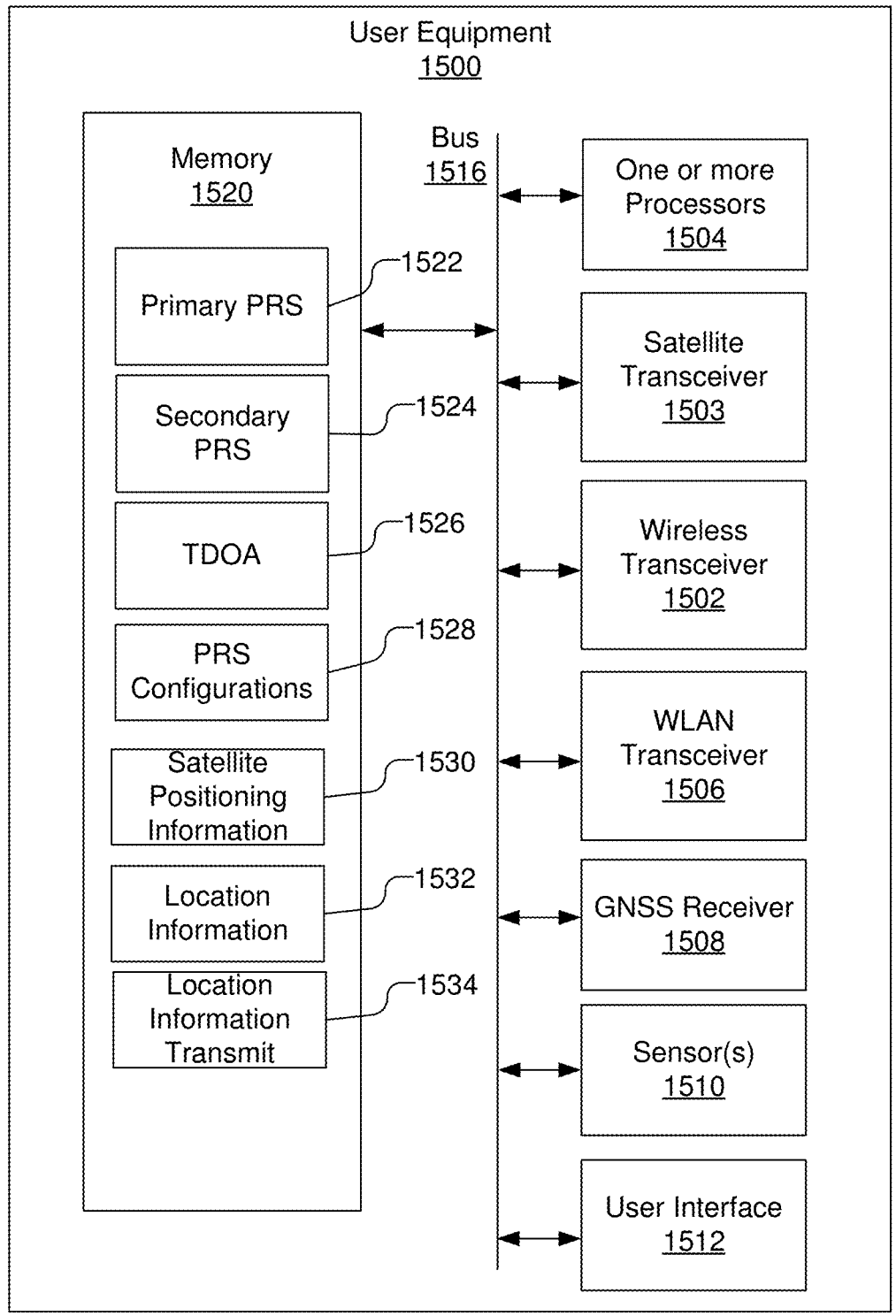
FIG. 15 is a diagram illustrating an example of a hardware implementation of a UE configured for position determination of the UE based on propagation delay difference measurements of PRS transmitted by satellites in a non-terrestrial network.

FIG. 15 is a diagram illustrating an example of a hardware implementation of UE 1500, such as UE 115 shown in FIGS. 1, 4, and 12. The UE 1500, for example, may be configured to perform the process flow 1300 of FIG. 13. The UE 1500 may include, e.g., hardware components such as a satellite transceiver 1503 to wirelessly communicate with a satellite 140 in a non-terrestrial network, such as wireless system 100, e.g., shown in FIG. 1. The UE 1500 may further include wireless transceiver 1502 to wirelessly communicate with terrestrial base stations, e.g., base stations 105 shown in FIG. 2. The UE 1500 may also include additional transceivers, such a wireless local area network (WLAN) transceiver 1506, as well as an GNSS receiver 1508 for receiving and measuring signals from GNSS satellites 521 (shown in FIG. 5). The UE 1500 may further include one or more sensors 1510, such as cameras, accelerometers, gyroscopes, electronic compass, magnetometer, barometer, etc. The UE 1500 may further include a user interface 1512 that may include e.g., a display, a keypad or other input device, such as virtual keypad on the display, through which a user may interface with the UE 1500. The UE 1500 further includes one or more processors 1504 and memory 1520, which may be coupled together with bus 1516. The one or more processors 1504 and other components of the UE 1500 may similarly be coupled together with bus 1516, a separate bus, or may be directly connected together or coupled using a combination of the foregoing. The memory 1520 may contain executable code or software instructions that when executed by the one or more processors 1504 cause the one or more processors to operate as a special purpose computer programmed to perform the methods and procedures disclosed herein (e.g. such as the process flow 1300 shown in FIG. 13).

As illustrated in FIG. 15, the memory 1520 may include one or more components or modules that may be implemented by the one or more processors 1504 to perform the methodologies described herein. While the components or modules are illustrated as software in memory 1520 that is executable by the one or more processors 1504, it should be understood that the components or modules may be firmware or dedicated hardware either in the one or more processors 1504 or off the processors.

As illustrated, the memory 1520 may include a primary PRS module 1522 that that when implemented by the one or more processors 1504 configures the one or more processors 1504 to receive primary PRS from satellites in a non-terrestrial network, e.g., via the satellite transceiver 1503, wherein the primary PRS is transmitted periodically with one or more primary PRS positioning occasions per radio frame, e.g., as discussed in reference to FIGS. 7-11, and stages 6, 7, and 8 of FIG. 12, and block 1302 of FIG. 13.

The memory 1520 may include a secondary PRS module 1524 that when implemented by the one or more processors 1504 configures the one or more processors 1504 to receive secondary PRS from the plurality of satellites in the non-terrestrial network, via the satellite transceiver 1503, wherein the secondary PRS is transmitted periodically with one or more secondary PRS positioning occasions per radio frame and provides timing information to resolve frame level timing ambiguity of the primary PRS, e.g., as discussed in reference to FIGS. 7-11, and stages 6, 7, and 8 of FIG. 12, and block 1304 of FIG. 13. The timing information may be, e.g., related to the radio frame number or primary PRS burst index. The primary PRS and secondary PRS may be time domain multiplexed or frequency domain multiplexed.

The memory 1520 may include a TDOA module 1526 that when implemented by the one or more processors 1504 configures the one or more processors 1504 to determine a TDOA measurement using the primary PRS and secondary PRS received from a first satellite and the primary PRS and secondary PRS received from second satellite, wherein the secondary PRS received from the first and second satellites resolve frame level timing ambiguity in the TDOA measurement caused by propagation delay difference between the satellites and the UE exceeding half the radio frame, e.g., as discussed in reference to FIG. 8, stages 9 and 10 of FIG. 12, and block 1306 of FIG. 13.

The memory 1520 may include a PRS configurations module 1528 that when implemented by the one or more processors 1504 configures the one or more processors 1504 to receive PRS configurations, including primary PRS and secondary PRS received from a serving satellite, e.g., in an RRC message, via the satellite transceiver 1503, e.g., as discussed in reference to FIG. 7 and stage 4 of FIG. 12. One of the parameters for the secondary PRS, for example, may be an indication of deployment of the secondary PRS for the non-terrestrial network or non-deployment of the secondary PRS for a terrestrial network. The PRS configurations may be used by the UE to 1500 to search for and receive the primary and secondary PRS signals from satellites and performing TDOA measurements.

The memory 1520 may include a satellite positioning information module 1530 that when implemented by the one or more processors 1504 configures the one or more processors 1504 to receive satellite positioning information, such as positions, velocities, and directions of the satellites from a serving satellite, e.g., via satellite transceiver 1503, e.g., as discussed in reference to stage 5 of FIG. 12.

The memory 1520 may include a location information module 1532 that when implemented by the one or more processors 1504 configures the one or more processors 1504 to determine location information based on the TDOA measurements, e.g., as discussed in reference to stage 12 of FIG. 12. The location information, for example, may be the TDOA measurements for multiple satellite pairs. In another implementation, the location information may be a position of the UE determined using the TDOA measurements for multiple satellite pairs along with positions of the satellites obtained from satellite positioning information.

The memory 1520 may include a location information transmit module 1534 that when implemented by the one or more processors 1504 configures the one or more processors 1504 to transmit location information to a location server, e.g., via satellite transceiver 1503, e.g., as discussed in reference to stage 12 of FIG. 12.

A UE that is configured for supporting positioning of the UE may include a means for receiving primary positioning reference signals (PRS) from a plurality of satellites in a non-terrestrial network, wherein the primary PRS is transmitted periodically with one or more primary PRS positioning occasions per radio frame, which may be, e.g., the satellite transceiver 1503 and the one or more processors 1504 with dedicated hardware or implementing executable code or software instructions in medium memory 1520 such as the primary PRS module 1522. A means for receiving secondary PRS from the plurality of satellites in the non-terrestrial network, wherein the secondary PRS is transmitted periodically with one or more secondary PRS positioning occasions per radio frame and provides timing information to resolve frame level timing ambiguity of the primary PRS may be, e.g., the satellite transceiver 1503 and the one or more processors 1504 with dedicated hardware or implementing executable code or software instructions in medium memory 1520 such as the secondary PRS module 1524. A means for determining a Time Difference of Arrival (TDOA) measurement using the primary PRS received from a first satellite and a second satellite in the non-terrestrial network and the secondary PRS received from the first satellite and the second satellite, wherein the secondary PRS received from the first satellite and the second satellite resolve frame level timing ambiguity in the TDOA measurement caused by propagation delay difference between the satellite and the UE and the second satellite and the UE exceeding half the radio frame may be, e.g., the one or more processors 1504 with dedicated hardware or implementing executable code or software instructions in medium memory 1520 such as the TDOA module 1526.

In one implementation, the UE may include a means for receiving Radio Resource Control (RRC) configurations that provide parameters for the secondary PRS, which may be, e.g., the satellite transceiver 1503 and the one or more processors 1504 with dedicated hardware or implementing executable code or software instructions in medium memory 1520 such as the PRS configurations module 1528.

Figure 16:
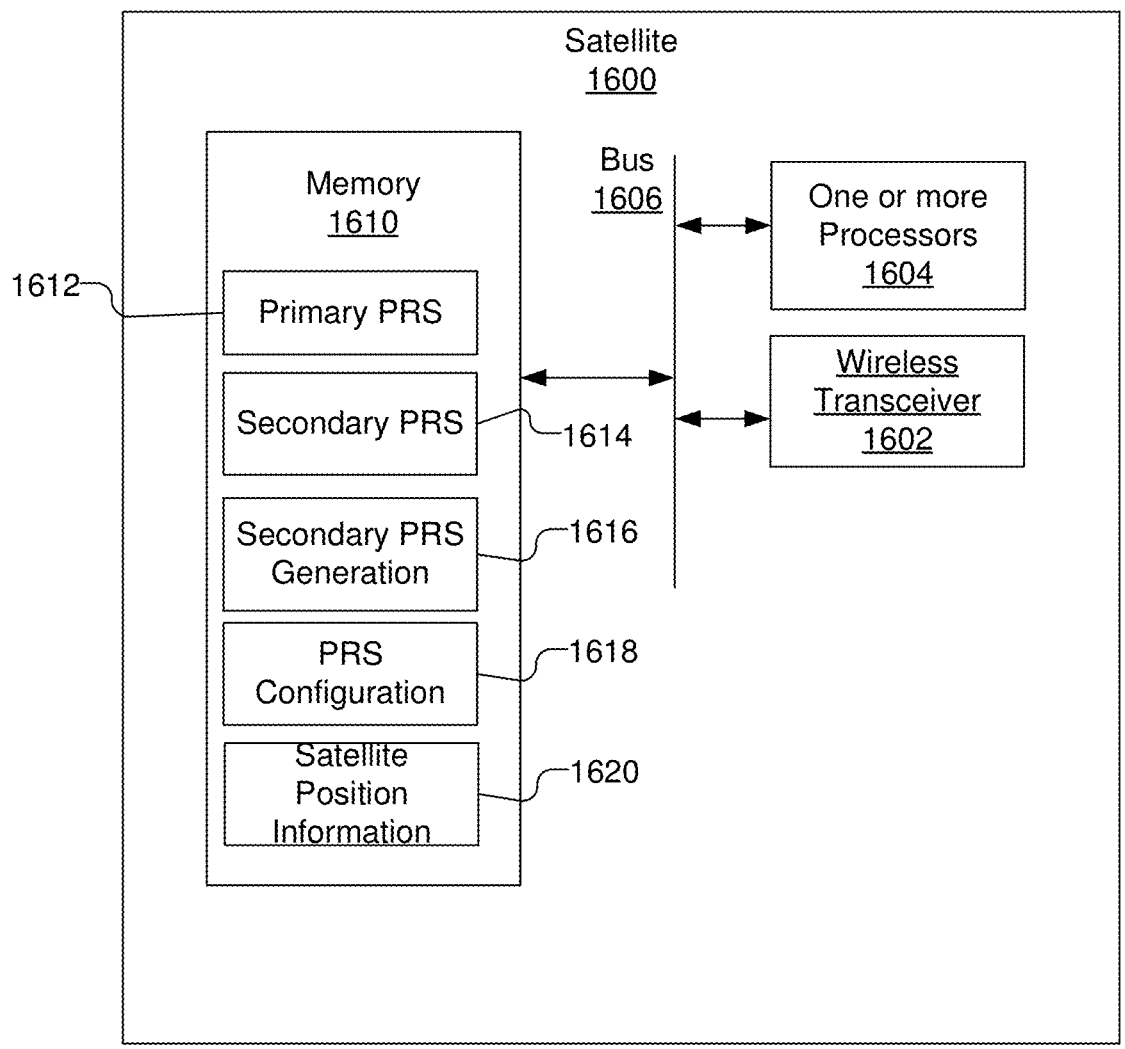
FIG. 16 is a diagram illustrating an example of a hardware implementation of a satellite configured for position determination of the UE based on propagation delay difference measurements of PRS transmitted by satellites in a non-terrestrial network.

FIG. 16 is a diagram illustrating an example of a hardware implementation of a satellite 1600, e.g., satellite 140 shown in FIGS. 1, 4, 5, and 12. The satellite 1600 is configured to be in non-terrestrial network, such as wireless system 100, e.g., shown in FIG. 1, and to support positioning of the UE 115. The satellite 1600 may perform the process flow 800 of FIG. 8. The satellite 1600, for example, may be configured to perform the process flow 1400 of FIG. 14. The satellite 1600 includes, e.g., hardware components such as a wireless transceiver 1602 capable of communicating with UEs 115, as well gateways, e.g., base stations 105, to the non-terrestrial network, and to other satellites 140. The satellite 1600 includes one or more processors 1604 and memory 1610, which may be coupled together with a bus 1606. The memory 1610 may contain executable code or software instructions that when executed by the one or more processors 1604 cause the one or more processors 1604 to operate as a special purpose computer programmed to perform the techniques disclosed herein (e.g. such as the process flow 1400 shown in FIG. 14).

As illustrated in FIG. 16, the memory 1610 may include one or more components or modules that may be implemented by the one or more processors 1604 to perform the methodologies as described herein. While the components or modules are illustrated as software in memory 1610 that is executable by the one or more processors 1604, it should be understood that the components or modules may be firmware or dedicated hardware either in the one or more processors 1604 or off the processors.

As illustrated, the memory 1610 may include a primary PRS module 1612 that that when implemented by the one or more processors 1604 configures the one or more processors 1604 to transmit primary PRS, e.g., to a UE 115, e.g., via the wireless transceiver 1602, wherein the primary PRS is transmitted periodically with one or more primary PRS positioning occasions per radio frame, e.g., as discussed in reference to FIGS. 7-11, and stages 6, 7, and 8 of FIG. 12, and block 1402 of FIG. 14.

The memory 1610 may include a secondary PRS module 1614 that when implemented by the one or more processors 1604 configures the one or more processors 1604 to transmit secondary PRS to the UE 115, via the wireless transceiver 1602 with one or more secondary PRS positioning occasions per radio frame that provide timing information to resolve frame level timing ambiguity of the primary PRS, e.g., as discussed in reference to FIGS. 7-11, and stages 6, 7, and 8 of FIG. 12, and block 1304 of FIG. 13. The secondary PRS resolves frame level timing ambiguity in Time Difference of Arrival (TDOA) measurements determined by the UE using the primary PRS and the secondary PRS from the satellite with primary PRS and secondary PRS from a second satellite that is caused by propagation delay difference between the satellite and the UE and between the second satellite and the UE exceeding half of the radio frame. The secondary PRS may be transmitted time domain multiplexed or frequency domain multiplexed with the primary PRS.

The memory 1610 may include a secondary PRS generation module 1616 that when implemented by the one or more processors 1604 configures the one or more processors 1604 to generate the secondary PRS, e.g., as discussed in reference to FIG. 7 and stages 6, 7, and 8 of FIG. 12. The secondary PRS may be generated, for example, by initializing a state of a secondary PRS sequence generator as a function of a radio frame number, a primary PRS burst index, or other parameter that may be used to resolve frame level timing ambiguity. The timing information provided by the secondary PRS, for example, may be the radio frame number modulo x or a primary PRS burst index modulo x, where x may be selected based on the periodicity of the secondary PRS.

The memory 1610 may include a PRS configuration module 1618 that when implemented by the one or more processors 1604 configures the one or more processors 1604 to obtain PRS configurations, including primary PRS and secondary PRS, for the satellite and neighbor satellites, which may be obtained from a server via wireless transceiver 1602, and to transmit the PRS configurations, e.g., in an RRC configuration message, to the UE 115, e.g., as discussed in reference to FIG. 7 and stage 4 of FIG. 12. For example, one parameter may be an indication of deployment of the secondary PRS for the non-terrestrial network.

The memory 1610 may include a satellite position information module 1620 that when implemented by the one or more processors 1604 configures the one or more processors 1604 to obtain satellite position information, such as positions, velocities, and directions of the satellites, which may be obtained from a server via wireless transceiver 1602, and to transmit the satellite position information, e.g., in an RRC configuration message, to the UE 115, e.g., as discussed in reference to FIG. 7 and stage 5 of FIG. 12.

The methodologies described herein may be implemented by various means depending upon the application. For example, these methodologies may be implemented in hardware, firmware, software, or any combination thereof. For a hardware implementation, the one or more processors 1604 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of satellite 1600 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1610) and executed by one or more processors 1604, causing the one or more processors 1604 to operate as a special purpose computer programmed to perform the techniques disclosed herein. Memory may be implemented within the one or processors 1604 or external to the one or more processors 1604. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by satellite 1600 may be stored as one or more instructions or code on a non-transitory computer-readable storage medium such as memory 1610. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for satellite 1600 may be provided as signals on transmission media included in a communication apparatus. For example, a communication apparatus comprising part or all of satellite 1600 may include a transceiver having signals indicative of instructions and data. The instructions and data are stored on non-transitory computer readable media, e.g., memory 1610, and are configured to cause the one or more processors 1604 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

A satellite in a non-terrestrial network may be configured to support positioning of a UE and may include a means for transmitting primary positioning reference signals (PRS), wherein the primary PRS is transmitted periodically with one or more primary PRS positioning occasions per radio frame, which may be, e.g., the wireless transceiver 1602 and the one or more processors 1604 with dedicated hardware or implementing executable code or software instructions in medium memory 1610 such as the primary PRS module 1612. A means for transmitting secondary PRS, wherein the secondary PRS is transmitted periodically with one or more secondary PRS positioning occasions per radio frame and provides timing information to resolve frame level timing ambiguity of the primary PRS may be, e.g., the wireless transceiver 1602 and the one or more processors 1604 with dedicated hardware or implementing executable code or software instructions in medium memory 1610 such as the secondary PRS module 1614. The secondary PRS resolves frame level timing ambiguity in Time Difference of Arrival (TDOA) measurements determined by the UE using the primary PRS and the secondary PRS from the satellite with primary PRS and secondary PRS from a second satellite that is caused by propagation delay difference between the satellite and the UE and between the second satellite and the UE exceeding half of the radio frame.

The satellite may include a means for generating the secondary PRS by initializing a state of a secondary PRS sequence generator as a function of one of a radio frame number or a primary PRS burst index, which may be, e.g., the one or more processors 1604 with dedicated hardware or implementing executable code or software instructions in medium memory 1610 such as the secondary PRS generation module 1616.

The satellite may include a means for transmitting Radio Resource Control (RRC) configurations that provide parameters for the secondary PRS, which may be, e.g., the wireless transceiver 1602 and the one or more processors 1604 with dedicated hardware or implementing executable code or software instructions in medium memory 1610 such as the PRS configuration module 1618.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device". "wireless device" or "user equipment") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, a "mobile station" or "user equipment" is intended to include all devices, including wireless communication devices, user terminals, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station" or "user equipment." A mobile device or user equipment (UE) may also be referred to as a mobile terminal, a terminal, a device, a Secure User Plane Location Enabled Terminal (SET), a target device, a target, or by some other name.

While some of the techniques, processes, and/or implementations presented herein may comply with all or part of one or more standards, such techniques, processes, and/or implementations may not, in some embodiments, comply with part or all of such one or more standards.

Although particular embodiments have been disclosed herein in detail, this has been done by way of example for purposes of illustration only and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method for supporting positioning of a user equipment (UE) performed by the UE, comprising:
receiving primary positioning reference signals (PRS) from a plurality of satellites in a non-terrestrial network, wherein the primary PRS is transmitted periodically with one or more primary PRS positioning occasions per radio frame;
receiving secondary PRS from the plurality of satellites in the non-terrestrial network, wherein the secondary PRS is transmitted periodically with one or more secondary PRS positioning occasions per radio frame and provides timing information to resolve frame level timing ambiguity of the primary PRS; and
determining a Time Difference of Arrival (TDOA) measurement using the primary PRS received from a first satellite and a second satellite in the non-terrestrial network and the secondary PRS received from the first satellite and the second satellite, wherein the secondary PRS received from the first satellite and the second satellite resolve frame level timing ambiguity in the TDOA measurement caused by propagation delay difference between the first satellite and the UE and the second satellite and the UE exceeding half the radio frame.

2. The method of claim 1, wherein each secondary PRS positioning occasion is aligned with a corresponding primary PRS positioning occasion within each radio frame.

3. The method of claim 1, wherein a periodicity of the secondary PRS is an integer multiple of a periodicity of the primary PRS, wherein the integer multiple is greater than 1.

4. The method of claim 1, wherein either a same number of secondary PRS positioning occasions are transmitted per radio frame as primary PRS positioning occasions, fewer secondary PRS positioning occasions are transmitted per radio frame than primary PRS positioning occasions, or more secondary PRS positioning occasions are transmitted per radio frame than primary PRS positioning occasions.

5. The method of claim 1, wherein the timing information provided by the secondary PRS comprises information related to at least one of radio frame number or primary PRS burst index.

6. The method of claim 1, further comprising receiving Radio Resource Control (RRC) configurations that provide parameters for the secondary PRS.

7. The method of claim 1, wherein the primary PRS and the secondary PRS are multiplexed in time domain by transmitting the one or more primary PRS positioning occasions and the one or more secondary PRS positioning occasions in different symbols or are multiplexed in frequency domain by transmitting the one or more primary PRS positioning occasions and the one or more secondary PRS positioning occasions in a same symbol but with non-overlapping resource elements.

8. A user equipment (UE) configured to support positioning in a non-terrestrial network, comprising:
    a wireless transceiver configured to wirelessly communicate with satellites in the non-terrestrial network;
    at least one memory; and
    at least one processor coupled to the wireless transceiver and the at least one memory, the at least one processor configured to:
        receive primary positioning reference signals (PRS) from a plurality of satellites in the non-terrestrial network, via the wireless transceiver, wherein the primary PRS is transmitted periodically with one or more primary PRS positioning occasions per radio frame;
        receive secondary PRS from the plurality of satellites in the non-terrestrial network, via the wireless transceiver, wherein the secondary PRS is transmitted periodically with one or more secondary PRS positioning occasions per radio frame and provides timing information to resolve frame level timing ambiguity of the primary PRS; and
        determine a Time Difference of Arrival (TDOA) measurement using the primary PRS received from a first satellite and a second satellite in the non-terrestrial network and the secondary PRS received from the first satellite and the second satellite, wherein the secondary PRS received from the first satellite and the second satellite resolve frame level timing ambiguity in the TDOA measurement caused by propagation delay difference between the first satellite and the UE and the second satellite and the UE exceeding half the radio frame.

9. The UE of claim 8, wherein each secondary PRS positioning occasion is aligned with a corresponding primary PRS positioning occasion within each radio frame.

10. CuThe UE of claim 8, wherein a periodicity of the secondary PRS is an integer multiple of a periodicity of the primary PRS, wherein the integer multiple is greater than 1.

11. The UE of claim 8, wherein either a same number of secondary PRS positioning occasions are transmitted per radio frame as primary PRS positioning occasions, fewer secondary PRS positioning occasions are transmitted per radio frame than primary PRS positioning occasions, or more secondary PRS positioning occasions are transmitted per radio frame than primary PRS positioning occasions.

12. The UE of claim 8, wherein the timing information provided by the secondary PRS comprises information related to at least one of radio frame number or primary PRS burst index.

13. The UE of claim 8, wherein the at least one processor is further configured to receive, via the wireless interface, Radio Resource Control (RRC) configurations that provide parameters for the secondary PRS.

14. The UE of claim 8, wherein the primary PRS and the secondary PRS are multiplexed in time domain by transmitting the one or more primary PRS positioning occasions and the one or more secondary PRS positioning occasions in different symbols or are multiplexed in frequency domain by transmitting the one or more primary PRS positioning occasions and the one or more secondary PRS positioning occasions in a same symbol but with non-overlapping resource elements.

15. A method for supporting positioning of a user equipment (UE) performed by a satellite in a non-terrestrial network, comprising:
    transmitting primary positioning reference signals (PRS), wherein the primary PRS is transmitted periodically with one or more primary PRS positioning occasions per radio frame; and
    transmitting secondary PRS, wherein the secondary PRS is transmitted periodically with one or more secondary PRS positioning occasions per radio frame and provides timing information to resolve frame level timing ambiguity of the primary PRS;
    wherein the secondary PRS resolves frame level timing ambiguity in Time Difference of Arrival (TDOA) measurements determined by the UE using the primary PRS and the secondary PRS from the satellite with primary PRS and secondary PRS from a second satellite that is caused by propagation delay difference between the satellite and the UE and between the second satellite and the UE exceeding half of the radio frame.

16. The method of claim 15, wherein each secondary PRS positioning occasion is aligned with a corresponding primary PRS positioning occasion within each radio frame.

17. The method of claim 15, wherein a periodicity of the secondary PRS is an integer multiple of a periodicity of the primary PRS, wherein the integer multiple is greater than 1.

18. The method of claim 15, wherein either a same number of secondary PRS positioning occasions are transmitted per radio frame as primary PRS positioning occasions, fewer secondary PRS positioning occasions are transmitted per radio frame as primary PRS positioning occasions, or more secondary PRS positioning occasions are transmitted per radio frame as primary PRS positioning occasions.

19. The method of claim 15, wherein the timing information provided by the secondary PRS comprises information related to at least one of a radio frame number or a primary PRS burst index.

20. The method of claim 15, further comprising transmitting Radio Resource Control (RRC) configurations that provide parameters for the secondary PRS.

21. The method of claim 15, wherein the primary PRS and the secondary PRS are multiplexed in time domain by transmitting the one or more primary PRS positioning occasions and the one or more secondary PRS positioning occasions in different symbols or are multiplexed in frequency domain by transmitting the one or more primary PRS positioning occasions and the one or more secondary PRS positioning occasions in a same symbol but with non-overlapping resource elements.

22. The method of claim 15, wherein the primary PRS and the secondary PRS are quasi co-located.

23. A satellite in a non-terrestrial network configured to support positioning of a user equipment (UE), comprising:
a wireless transceiver configured to wirelessly communicate with the UE;
at least one memory; and
at least one processor coupled to the wireless transceiver and the at least one memory, the at least one processor configured to:
transmit primary positioning reference signals (PRS) via the wireless transceiver, wherein the primary PRS is transmitted periodically with one or more primary PRS positioning occasions per radio frame; and
transmit secondary PRS via the wireless transceiver, wherein the secondary PRS is transmitted periodically with one or more secondary PRS positioning occasions per radio frame and provides timing information to resolve frame level timing ambiguity of the primary PRS;
wherein the secondary PRS resolves frame level timing ambiguity in Time Difference of Arrival (TDOA) measurements determined by the UE using the primary PRS and the secondary PRS from the satellite with primary PRS and secondary PRS from a second satellite that is caused by propagation delay difference between the satellite and the UE and between the second satellite and the UE exceeding half of the radio frame.

24. The satellite of claim 23, wherein each secondary PRS positioning occasion is aligned with a corresponding primary PRS positioning occasion within each radio frame.

25. The satellite of claim 23, wherein a periodicity of the secondary PRS is an integer multiple of a periodicity of the primary PRS, wherein the integer multiple is greater than 1.

26. The satellite of claim 23, wherein either a same number of secondary PRS positioning occasions are transmitted per radio frame as primary PRS positioning occasions, fewer secondary PRS positioning occasions are transmitted per radio frame as primary PRS positioning occasions, or more secondary PRS positioning occasions are transmitted per radio frame as primary PRS positioning occasions.

27. The satellite of claim 23, wherein the timing information provided by the secondary PRS comprises information related to at least one of a radio frame number or a primary PRS burst index.

28. The satellite of claim 23, the at least one processor is further configured to transmit Radio Resource Control (RRC) configurations that provide parameters for the secondary PRS.

29. The satellite of claim 23, wherein the primary PRS and the secondary PRS are multiplexed in time domain by transmitting the one or more primary PRS positioning occasions and the one or more secondary PRS positioning occasions in different symbols or are multiplexed in frequency domain by transmitting the one or more primary PRS positioning occasions and the one or more secondary PRS positioning occasions in a same symbol but with non-overlapping resource elements.

30. The satellite of claim 23, wherein the primary PRS and the secondary PRS are quasi co-located.

* * * * *